United States Patent
Riibe

[11] Patent Number: 5,806,833
[45] Date of Patent: Sep. 15, 1998

[54] UNIVERSAL NON-WELD PIPE COUPLING

[76] Inventor: Gary Riibe, 5529 S. 152nd St., Omaha, Nebr. 68137

[21] Appl. No.: 507,774
[22] Filed: Jul. 26, 1995
[51] Int. Cl.$^6$ ....................................................... F16K 1/22
[52] U.S. Cl. ........................ 251/305; 285/146.2; 285/261; 285/368; 285/422; 285/906
[58] Field of Search ................................. 285/166, 167, 285/184, 352, 271, 381, 342, 343, 176, 146.2, 261, 368, 422; 251/305

[56] References Cited

U.S. PATENT DOCUMENTS

| | | |
|---|---|---|
| 815,581 | 3/1906 | Dean . |
| 1,309,146 | 7/1919 | Mann . |
| 1,782,484 | 11/1930 | Spencer et al. ........................... 285/167 |
| 1,960,472 | 5/1934 | Balaam et al. .............................. 299/58 |
| 1,980,451 | 11/1934 | Taylor ...................................... 285/130 |
| 2,449,243 | 9/1948 | Miller ....................................... 285/135 |
| 2,461,856 | 2/1949 | Tornberg ...................................... 18/12 |
| 2,764,431 | 9/1956 | Wilde ....................................... 285/415 |
| 3,276,795 | 10/1966 | Heygate .............................. 285/271 X |
| 3,361,450 | 1/1968 | Frank ....................................... 285/271 |
| 3,421,781 | 1/1969 | Spurk ....................................... 285/176 |
| 3,498,643 | 3/1970 | Reiss ....................................... 285/189 |
| 3,720,428 | 3/1973 | Zastawny ................................. 285/368 |
| 3,752,509 | 8/1973 | Stafford ................................... 285/334.4 |
| 3,917,324 | 11/1975 | Wakatsuki et al. ...................... 285/341 |
| 4,429,903 | 2/1984 | Baker ......................................... 285/24 |
| 4,696,494 | 9/1987 | Schmitz et al. ...................... 285/184 X |

FOREIGN PATENT DOCUMENTS

| | | | |
|---|---|---|---|
| 469210 | 11/1950 | Canada .................................. 285/266 |
| 841091 | 6/1952 | Germany ................................. 285/341 |

Primary Examiner—Dave W. Arola
Attorney, Agent, or Firm—Zarley, McKee, Thomte, Voorhees & Sease

[57] ABSTRACT

The invention comprises a non-weld coupling and method adapted to connect two conduits. The conduits may be pipes, hoses, valves or the like and may be cylindrical, rectangular or the like, in shape. The first embodiment relates to conduits where there may be a degree of misalignment therebetween and which the coupling is adapted to accommodate. In this first embodiment, the coupling comprises a seal flange, seal block and seal ring. The flange, block and ring have mating surfaces defining a radius of curvature which permit the components to be pivoted and rotated relative to the pipe while still maintaining a fluid or air tight fit therebetween. The second embodiment relates to the coupling of two conduit segments in substantial alignment.

22 Claims, 13 Drawing Sheets

UNIVERSAL NON-WELD PIPE COUPLING

BACKGROUND OF THE INVENTION

1. Technical Field

The present invention relates generally to an apparatus and method of providing a tight seal between two conduits such as pipes hoses or the like.

More specifically, in a first preferred embodiment, the invention relates to an apparatus and method of providing a coupling permitting a tight seal between two conduit segments without the need for welding any of the connecting components and furthermore provide such a seal where a misalignment may exist between joined segments.

Throughout the specification, we will use the term "misalignment" to refer to the situation where the longitudinal axes of the two segments, are not co-linear.

This first embodiment of the invention is particularly well suited for accommodating the misalignment commonly associated with joining pipe segments such as on the outlet pipes on material transports such as trailers and tanker cars or in other environments where pipes or other conduits may be joined, such as steam generating plants, water irrigation systems and the like.

Throughout the specification, the terms "pipes", "conduits", "hoses" and "valves" will be used interchangeably to refer to means adapted to convey material, be it gas, solid, or liquid, from one point to another. Furthermore, the expressions "tight seal" and "tight fit" will be used throughout the specification to refer to a seal between conduits and couplings which prevent the escape of liquids, gases, or solids.

In a second preferred embodiment, the invention provides an apparatus to join two pipe segments which are in substantial alignment. Such need may arise as a result of cutting out a defective pipe segment and splicing in a good segment.

As mentioned, one major use for the present invention is in situations involving liquid or bulk tanks. In these situations commonly a liquid or bulk tank will be associated with a railroad car or semi-trailer rig for long distance transportation of the liquid or bulk material. The material may comprise either liquid or solid material such as fuel, flour and the like. In these tank operations, each car or trailer tank will include a hopper extending the length of the trailer or car. Each hopper would be provided with a plurality of dispensing stations positioned generally lengthwise along the centerline of the trailer or car. In the art, these dispensing stations may be referred to as "dispensing boots."

The dispensing stations or "boots" will typically comprise a series of walls which are tapered downwardly and inwardly so as to focus the dispensing of the material to a single area. An outlet of some type would be provided at this dispensing compartment focal point in order to permit the discharge or out flow of the material from that particular dispensing compartment. Generally, there will be an outlet pipe secured to each dispensing station which will allow for the discharge of the material outwardly away from the dispensing compartment. Thus, if there are three separate dispensing compartments, there are three separate outlet pipes directed outwardly therefrom. These outlet pipes will usually be oriented downwardly so that the outlet of the material is directed out the bottom of the discharge boot.

Ideally, the outflow from each of these outlet pipes will be positioned co-linearly. That is, that the discharge will occur at the three separate points all located along the centerline of the trailer/car. The theory being that a T-connector can be used to connect each outlet pipe to a discharge pipe, combining the output of the outlet pipes. A flow control valve may also be positioned between the outlet pipe and the T-connector.

Connections between the outlet pipe, valve and T-connector are generally made using conventional flanges. Use of a single discharge pipe allows a single flow to convey the transported material to the storage compartment utilized. Depending on the type of material being dispensed (e.g. solids), it may be desirable to use air under pressure to facilitate the dispensing process. In that situation, compressed air would be introduced in one end of the discharge pipe, forcing the material out the other end.

The manner in which trailerstankers are constructed makes connection of the boot outlet pipes to a discharge pipe T-connector difficult. It is extremely difficult to ensure that all of the outlet pipes line-up. In practice, there is almost always some deviation of the pipes from the tank centerline. Such displacements result in a "misalignment" relative to a centerline discharge pipe which must somehow be corrected or accommodated in order to connect the outlet pipe to the T-connector and discharge pipe and maintain good seal between the two. This is generally accomplished by orienting the flange on the T-connector so that it is "square" with the flange on the outlet pipe, prior to welding the flange to the T-connector. This in effect creates a one-of-a-kind T-connector which is suitable for use only on that outlet pipe.

Clearly, individual construction and fitting of each T-connector is a very time consuming and expensive process. One estimate puts the labor required to install a discharge pipe at up to 24 man-hours. Furthermore, the heat generated by the welding process for each individual T-connector may cause previously aligned flanges to deviate slightly from the previously selected position, necessitating a repositioning and rewelding of that T-connector flange. Consequently, there is a great need for a universal coupling which is capable of accommodating small misalignments between two pipes or other conduits. It would be of great additional benefit if such a universal coupling were adapted to achieve a tight fit without the need of welding of any of the pipe components.

Additionally, there are other situations where two conduits in substantial alignment need to be coupled such as where segments are being used to create a longer pipe or where a small portion of a pipe becomes damaged. In this latter situation, it is not uncommon for the entire pipe to have to be replaced due to the lack of a convenient mechanism for splicing in a small section of pipe. Thus, there is also need for a means of permitting the replacement of a small segment of pipe, without the need for replacing the entire pipe.

2. Description of the Prior Art

Miller, U.S. Pat. No. 2,449,243, discloses a self-aligning pipe flange designed to accommodate small amounts of misalignment. However, it is designed to accommodate misalignments reflected in very small on-center misalignment only. Furthermore, the misalignment and flexibility of the joint is limited to the compressibility of the seal material. The Miller sealing method is to compress the seal with the flange against the end of the pipe. The small misalignment which may be corrected equates to the amount by which the seal may be compressed. Furthermore, the Miller design is limited since it cannot be used with flow control valves such as a Keystone butterfly valve due to the pre-existing seal on the valve.

Another prior art example is Stafford, U.S. Pat. No. 3,752,509 which discloses a metal-to-metal tube seal. Since it is metal-to-metal, there is no dampening, and thus the connection could break, as vibration passes through all surfaces. Additionally, the amount of movement is limited to 3 degrees each way and space between seal and seal. Furthermore, the Stafford seal is non-flexible when tightened, and extensive machining of the metal seal, flange, and pipe must be precise in order to provide the movement required to accommodate misalignment.

Tornberg, U.S. Pat. No. 2,461,856 discloses an apparatus designed to mount extrusion dies on plastic extrusion machines allowing for dies to be easily interchanged and to be properly fitted to the discharge end of the extrusion machine. It is designed to ensure proper positioning of the die and a positive seal against leakage, even if tightened unevenly. It is not designed to accommodate misalignment problems. The seal area is machined into the pipes and the pipes are butted together to form the seal. The Tornberg design does not appear to allow for rotation since rotation will cause the connection to "pop out".

Mann, U.S. Pat. No. 1,309,146 discloses a pipe joint designed to make the pipe connection doubly secure against leakage. The Mann joint is designed so that the joint is kept tight regardless of the expansion and contraction of the pipes due to changes in temperature and even though the pipe may sag or be bent laterally at the connection. There is no indication that the design accommodates misalignment.

Finally, Zastawny U.S. Pat. No. 3,720,428 discloses a pipe coupling design which does not specifically provide for misalignment. Rather, it is designed to keep pipes from blowing apart due to internal pressures. The coupling is designed for bell and spigot end water pipe joints where the two pipes fit inside each other. The coupling requires a perfect alignment of the pipes. Furthermore, the pipe ends must be specially made.

Therefore, there is a great need for a pipe coupling which may be used to couple two conduits and which would work without the need for special machining of the mating ends or of special fittings and which would provide a tight fit without the need for welding components and furthermore which is adapted to provide a tight fit even when there is misalignment between the conduits. Furthermore, there is a need for a coupling adapted to provide a tight fit between two straight conduit or pipe segments. The conduits may be a pipe, control valve, hose or the like and the conduit may be adapted to carry solids, liquids, or gases.

Consequently, it is an objective of the present invention to provide a coupling which requires no specially formed hubs, flanges or machining of the pipes but rather fits on stock pipes.

It is a further objective of the present invention to provide a coupling designed to correct various misalignments by varying the radius specifications of the various seal block, ring, and flange surface areas.

It is a further objective of the present invention to provide a design which allows for a consistent compression of the seal regardless of the misalignment between coupling pipes.

It is a further objective to provide a coupling wherein the range of misalignments which may be accommodated may be adjusted by using components of different dimensions and more specifically using seal blocks, seal rings, and sealing flanges of a radius of curvature corresponding to the degree of misalignment.

It is a further objective of the present invention designed for numerous applications and can be used wherever two pipes need to be joined. For example, to seal a flange against a valve; to attach two misaligned pipes; to work on the discharge and air parts of a trailer, etc.

It is a further objective to provide a coupling which is environmentally friendly, having no toxic by-products, presenting a solution to various EPA concerns and related problems; having no toxic adhesives; which can be used on plastic; and which can be made out of any of the so-called "space age" polymers.

It is a further objective of the present invention to provide a universal non-weld adjustable coupling having as its primary function, the connection of two sections of piping without the need of a welded flange yet with the capability to adjust for existing misalignment, thus providing a more efficient and cost-effective coupling.

It is a further objective to provide a non-weld coupling which can be used on both discharge and air-piping systems.

It is a further objective to provide a coupling adapted to be used in liquid, solid, and gaseous discharge and transport systems.

It is a further objective to provide a coupling wherein the coupling is non-weld and adjustable and the piping is assembled once, thus saving trailer manufacture and production costs.

It is a further objective to provide a coupling which eliminates the need for fitting the pipe flange, tack-welding, disassembly, welding, and re-assembly.

It is a further objective to provide a coupling wherein the adjustability of the coupling accommodates a misalignment, thus permitting the use of a less skilled labor force in the installation of piping.

It is a further objective to provide a coupling wherein the versatility of the flange allows the use of various types of pre-cast T-connectors, permitting a greater quantity of out-sourced materials on the trailer, further reducing the cost of labor.

It is a further objective to provide a coupling wherein any re-work or repair required during the manufacturing process, may be completed easily with some or all of the original parts.

It is a further objective to provide a coupling wherein the adjustability and ease of installation of the flange is a great advantage to the field repair business by allowing a flange and/or a stock T-coupling to be replaced in the field with only a couple of wrenches, eliminating the requirement for extensive fitting, welding, and shop facilities required by the prior art.

It is a further objective to provide a coupling which may be constructed using plastic material, resulting in a coupling which is lighter, cheaper, non-corrosive, and easier to replace.

It is a further objective to provide a non-weld coupling resulting in straighter piping, greater reliability, more strength, and less stress from misaligned assembly, resulting in a better appearance and a higher quality trailer which is easier to manufacture and repair. In addition, due to the seal, there is flexibility built into the system, lessening even further the stress on the assembly.

It is a further objective to provide a non-weld coupling which is food safe resulting from the lack of internal welding and finishing required.

It is a further objective to provide a non-weld coupling which can easily be disassembled for cleaning.

It is a further objective to provide a coupling having a built-in butterfly clearance for wet-dry valves.

It is a further objective to provide a coupling which will accommodate innerchangeability of materials, for example, steel on aluminum, stainless on aluminum, etc., and which can also be used on cast or welded T-connectors.

It is a further objective to provide a coupling which is cheaper to manufacture, more reliable, and easier to repair for the customer.

It is a further objective to provide a coupling which will accommodate all sizes and shapes of pipe including the standard 3, 4, and 5 inch diameter pipes.

It is a further objective to provide a coupling which allows rotation of the sealing flange so as to permit the easy alignment of connecting holes between components.

It is a further objective to provide a coupling wherein the components thereof permit the dampening of any vibrations, thus greatly reducing the possibility of breakage of the joint therefrom.

It is a further objective to provide a coupling wherein the seal block may be constructed of a variety of materials such as nylon, plastic, rubber and the like.

It is a further objective to provide a coupling wherein the flange and seal ring may be constructed of a variety of materials such as aluminum, plastic, or the like.

It is a further objective to provide a coupling which can be used with a variety of conduit shapes such as cylindrical, rectangular, hexagonal, or the like.

It is a further objective to provide a coupling which can be used to couple different types of conduits such as pipes, valves, hoses and the like.

It is a final objective to provide a coupling which permits rotational and pivotal movement of the components during assembly.

SUMMARY OF THE INVENTION

The invention comprises two primary embodiments. The first embodiment relates to the coupling of one conduit to another, and between which a misalignment may exist. The second embodiment relates to the coupling of two conduit segments in substantial alignment.

The first embodiment discloses a universal non-weld pipe coupling adapted to provide a tight fit between a first pipe and one of a valve and second pipe, the first pipe being generally cylindrical in shape and having an opening in the end thereof, the first pipe being adapted to mount against a connecting gasket of a valve or second pipe to which the first pipe is to be connected.

While the majority of the discussion is directed to cylindrically shaped conduits, the invention is not so limited in its application. It is adapted to be used on conduits of any shape including rectangular, hexagonal as well as others.

The coupling comprises a seal block, sealing flange, and a seal ring. The cylindrical seal block describes a quasi-toroid of semi-circular cross-section having a generally cylindrical inner, pipe mounting surface and an outer sealing surface defined by a radius of curvature, the seal block has an inside diameter approximately equal to the outside diameter of the first pipe such that upon placement of the seal block thereon, a substantially friction tight fit is achieved therebetween. The sealing flange has an outer shoulder portion adapted for releasable securement to one of the valve and second pipe and an inner collar having an interior seal block mating surface with a radius of curvature substantially equivalent to the radius of curvature of the seal block outer sealing surface, the collar being adapted to contact the curved outer sealing surface of the seal block permitting rotational and pivotal movement of the flange relative to the seal block during assembly, while maintaining a tight seal therebetween once assembled. Finally, the annular seal ring has an interior seal block mating surface adapted to engage the seal block curved outer sealing surface and having a radius of curvature equivalent thereto such that a tight seal may be achieved therebetween, and an exterior flange collar mating surface adapted to mate with the flange collar, such that when the seal block, the sealing flange and the seal ring are compressed, a tight fit is achieved.

The seal flange is slipped over the end of the pipe. Next, the seal block is slidably placed on the coupling end of the pipe. Owing to the substantially equivalent diameters of the seal block and pipe, a semi-tight frictional fit is achieved therebetween. Finally, the seal ring would be placed on the pipe end, over the seal block.

The outer surface of the seal block is curved outwardly at a constant radius of curvature. Thus, the seal block describes a "quasi-toroid of semi-circular cross-section."

The sealing flange has a collar adapted to contact the seal block and an outer shoulder adapted to connect the sealing flange to a conduit such as a connecting pipe flange, valve, or the like. In the preferred embodiment, the sealing flange collar and shoulder are integrally formed. The sealing flange collar has an inner surface adapted to contact the seal block. This collar inside surface has a radius of curvature substantially identical to that of the seal block outer surface. Thus, this inner collar surface may be pivoted and/or rotated against the seal block outer surface while still making a tight seal therewith. Thus, pivotal movement of the connecting pipe relative to the flange may be made without losing the tight seal between the sealing flange inside surface and the seal block. Additionally, the ability of the flange to be rotated about the longitudinal axis of the pipe facilitates the alignment of the connecting bolt holes.

An annular seal ring having inside, outside and front surfaces defines a generally triangular cross-sectional shape. The inner and outer surfaces are adapted to contact the seal block and flange collar, respectively. The front, substantially flat surface of the seal ring is adapted to contact a sealing member of the conduit to which the pipe is being coupled. Generally this will be a gasket or the like.

When the sealing flange of the coupling is tightened against the connecting conduit, the seal ring, seal block, and sealing flange are all compressed together, achieving a tight seal.

There are several utilizations of the first embodiment. One such utilization is to couple a pipe to another pipe terminating in a conventional flange. A second utilization is to couple a pipe to a conventional valve such as a valve. In a third utilization, a coupling may be used on each of two pipes to accommodate an even larger misalignment.

The second preferred embodiment is used to couple two aligned pipe segments together. In this second embodiment, a universal non-weld pipe coupling adapted to provide a tight fit between aligned first and second pipes, has a seal block having first and second ends, the seal block has a curved outer surface at each of the two ends, each curved outer surface defining a radius of curvature, the seal block also having a generally smooth cylindrical interior surface of a diameter approximately equal to the outside diameter of the two pipes such that upon placement of a seal block thereon, a friction tight fit is achieved, and a raised center portion circumferentially surrounding the seal block. The first and second flanges, each have an outer shoulder portion adapted to releasably secure the flanges together and an inner collar having an interior surface with a radius of curvature equivalent to the radius of curvature of the seal block outer surface radius of curvature and being adapted to contact the curved outer surface of the seal block permitting rotational movement of the flange relative to the seal block during assembly, while maintaining a tight seal therebetween once assembled. The flange inner collars are adapted to contact the seal block raised center portion and achieve sealing engagement therewith when the first and second sealing flanges are releasably secured together such that, upon engagement and releasable securement of the first and second flanges, a tight fit may be achieved between the first and second pipes. This second embodiment may also be used on conduits that have a variety of shapes such as rectangular, cylindrical, hexagonal and the like.

The invention also discloses two novel methods involving the use of the apparatus of the present invention and concerning the coupling of conduits.

The first method relates to coupling two conduits with a misalignment therebetween comprising the steps of providing a universal non-weld pipe coupling of the first embodiment; providing a conduit having a means for connection to the sealing flange and to which the pipe is to be connected; installing the coupling on the pipe; providing a connecting gasket adapted to be positioned adjacent the conduit connection means; positioning the pipe and coupling adjacent the conduit connection means such that the seal ring contacts the connecting gasket; and releasably securing the sealing flange to the conduit connection means such that the connecting gasket compresses the seal ring and the sealing flange against the seal block thereby forming a tight seal between the pipe and the conduit.

The second method pertains to the coupling of conduit segments which are already in alignment and comprises the steps of: providing a universal non-weld pipe coupling of the second embodiment; providing first and second pipes to be coupled; placing the first flange over the end of the first pipe; placing the seal block over the first pipe; placing the second flange over the second pipe inserting the second pipe into the seal block; releasably securing the flanges together such that the seal block is compressed therebetween forming a tight seal between the first and second pipes.

DESCRIPTION OF THE PREFERRED EMBODIMENT

There are two primary embodiments in the present invention. The first embodiment relates to the coupling of one conduit to another, and between which a misalignment may exist. The second embodiment relates to the coupling of two aligned pipe segments.

Figure 1:
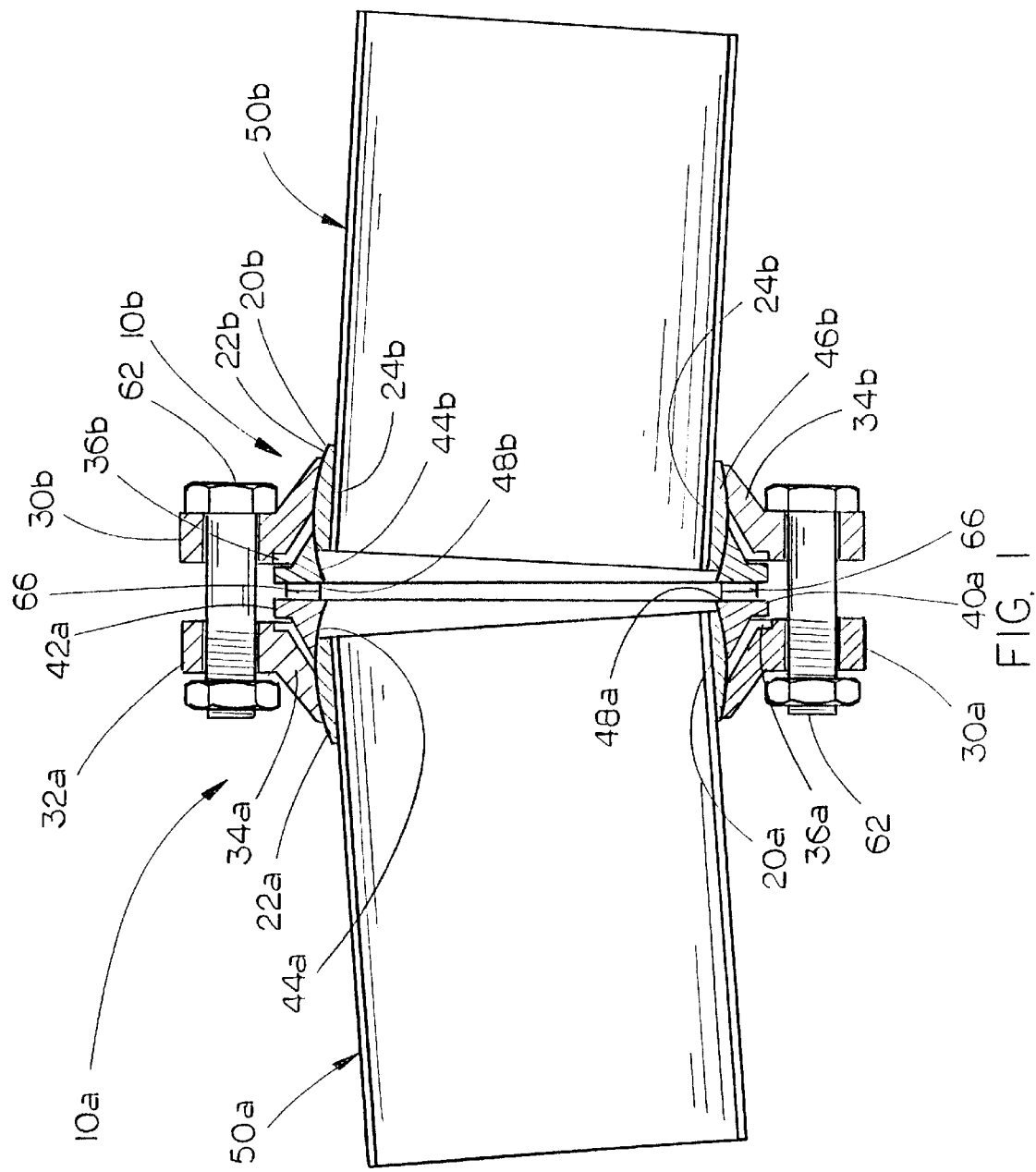
FIG. 1 is a cross-sectional side view illustrating components of a primary embodiment of the present invention and the use of the coupling to accommodate a misalignment of a pair of pipes.
Figure 2:
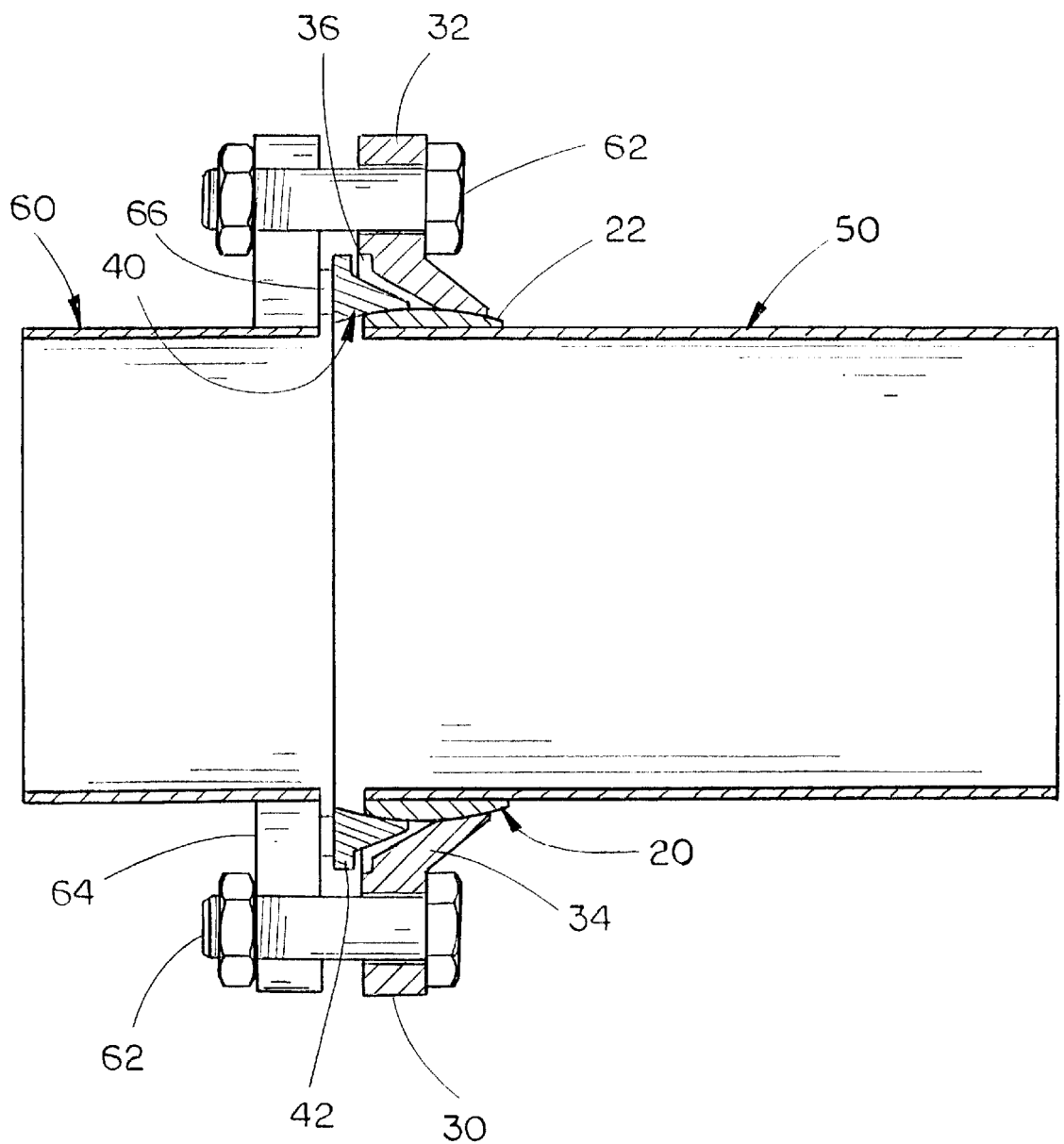
FIG. 2 is a cross-sectional side view of another primary embodiment of the present invention wherein the coupling of the present invention is used to couple one pipe segment to a second pipe terminating in a conventional flange.
Figure 3:
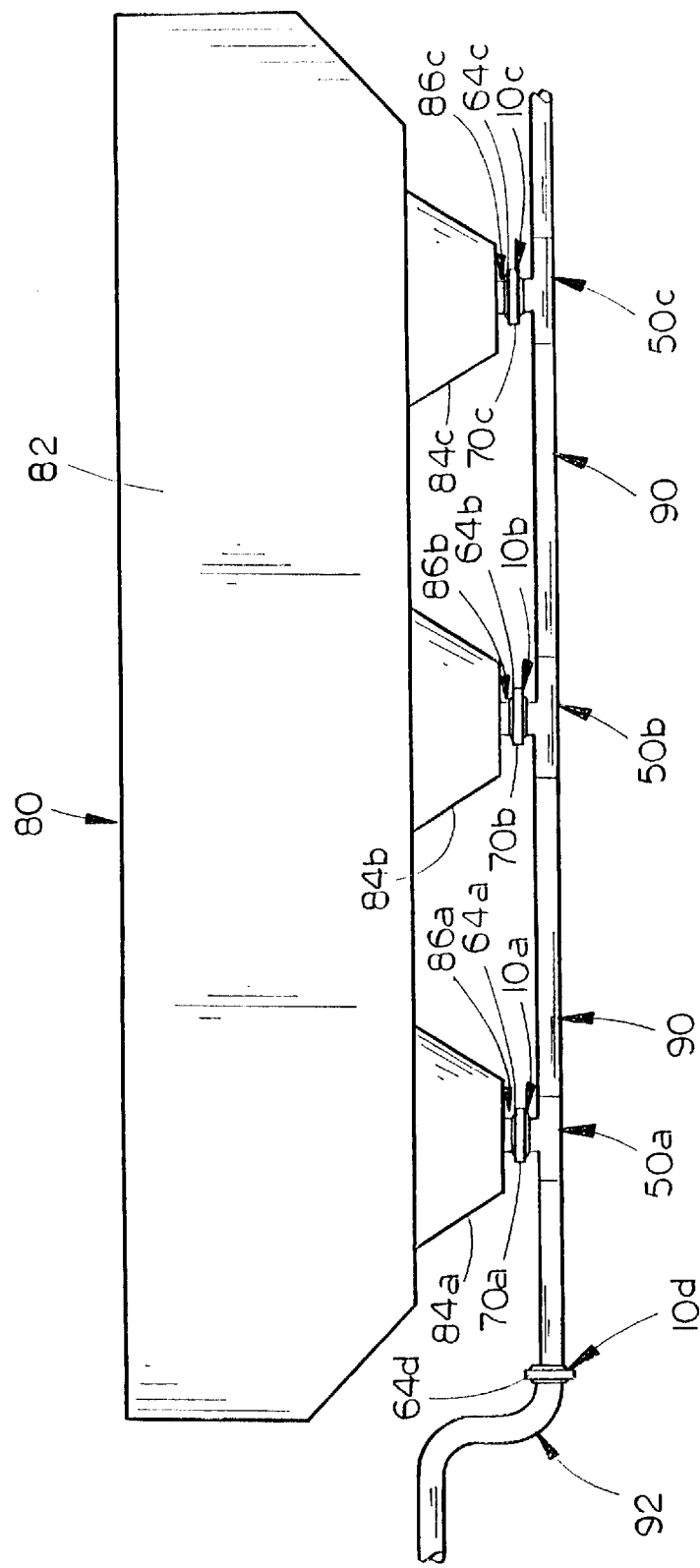
FIG. 3 illustrates one working environment where the coupling of the present invention can find great utility. Shown in this figure is a side view of a trailer and the pipes and other components used to transfer the transported material out of the trailer.
Figure 4:
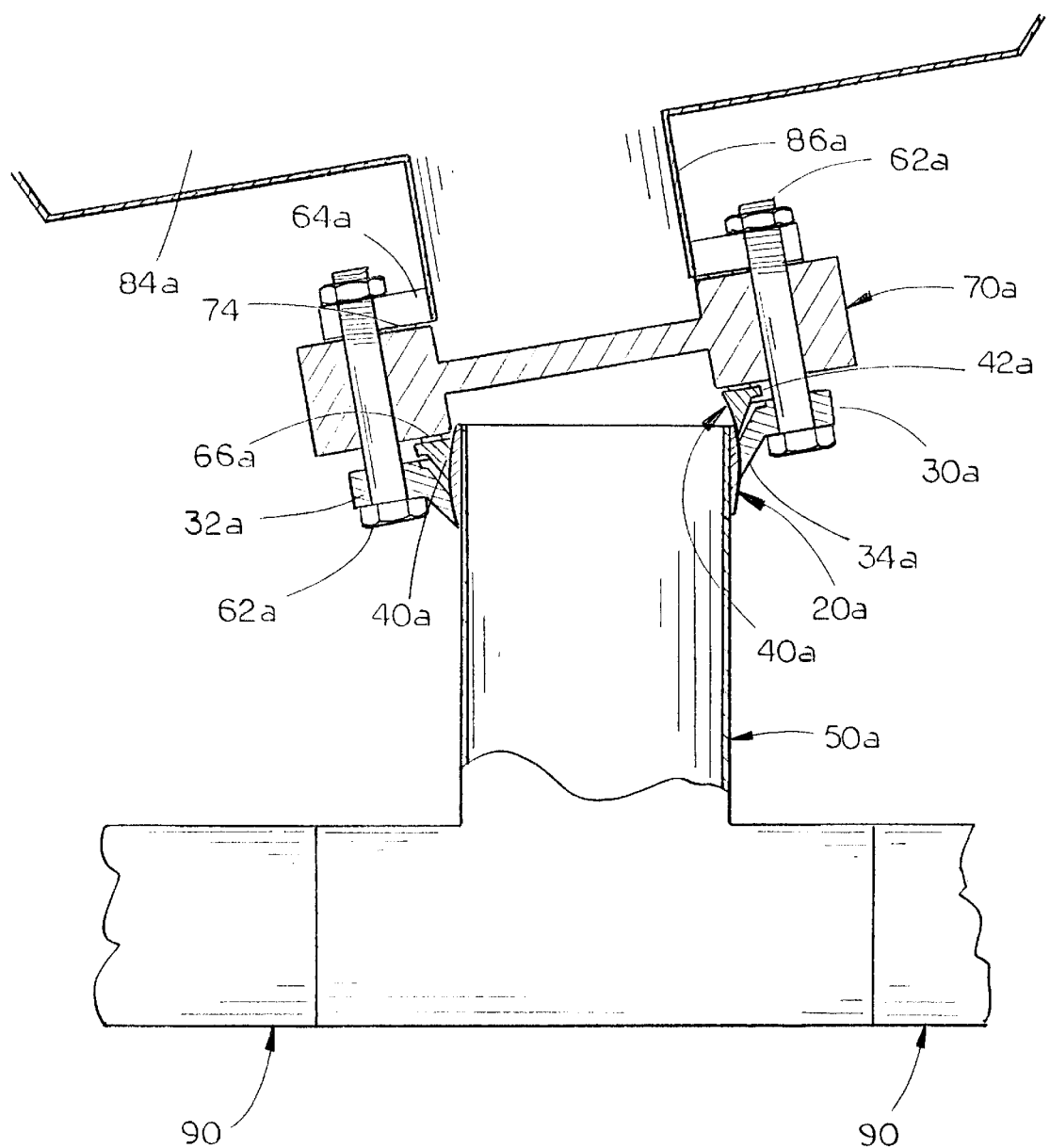
FIG. 4 is a cross-sectional side view further illustrating a working embodiment of the present invention and in particular illustrating a close-up view of the connection of a trailer outlet pipe to a T-connector and how a misalignment might be accommodated.
Figure 5:
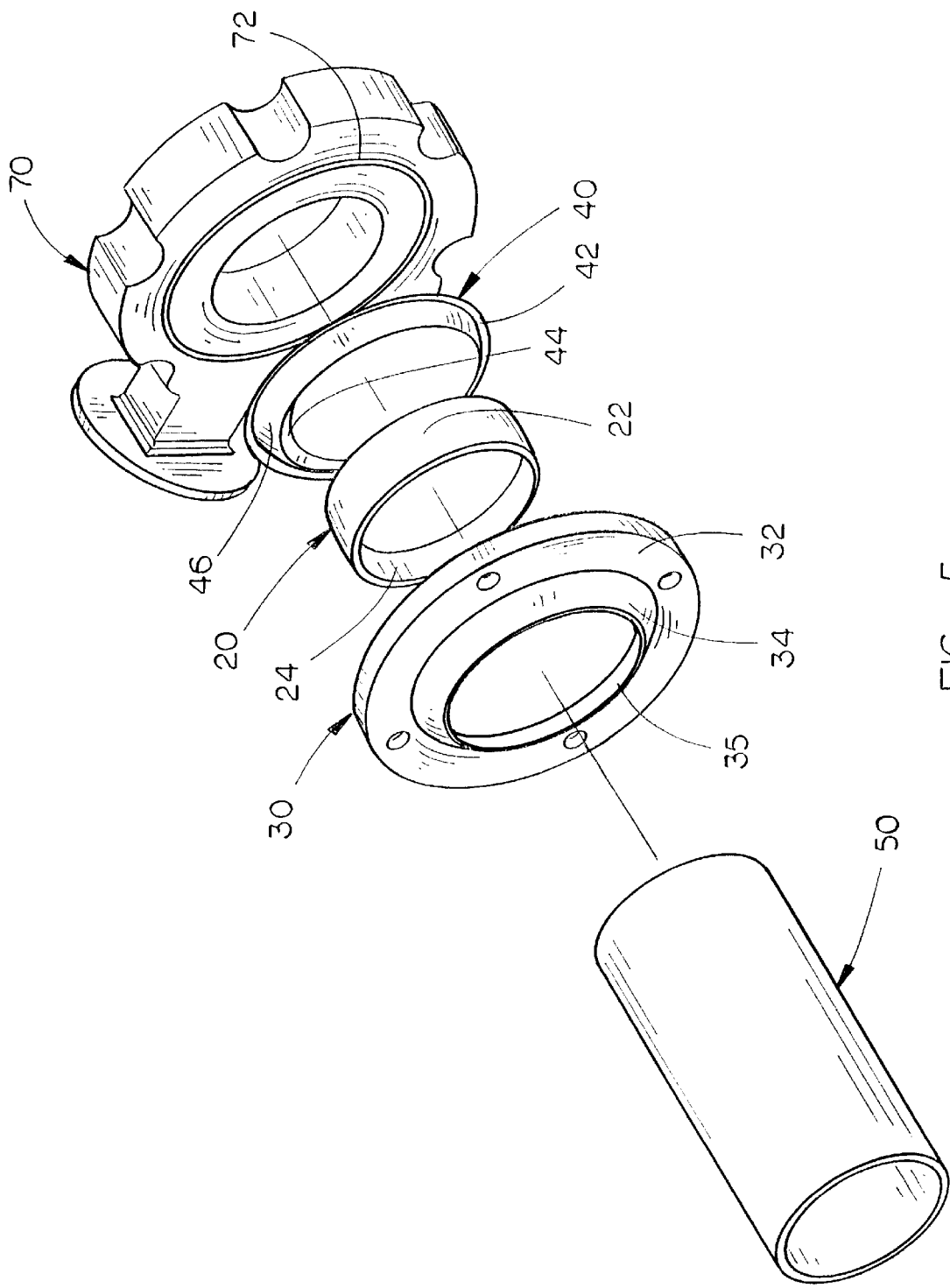
FIG. 5 is an exploded side view of another primary embodiment of the invention illustrating how the coupling of the present invention may be used to couple a pipe to a conventional flow control valve such as a Keystone "butterfly" valve.
Figure 6:
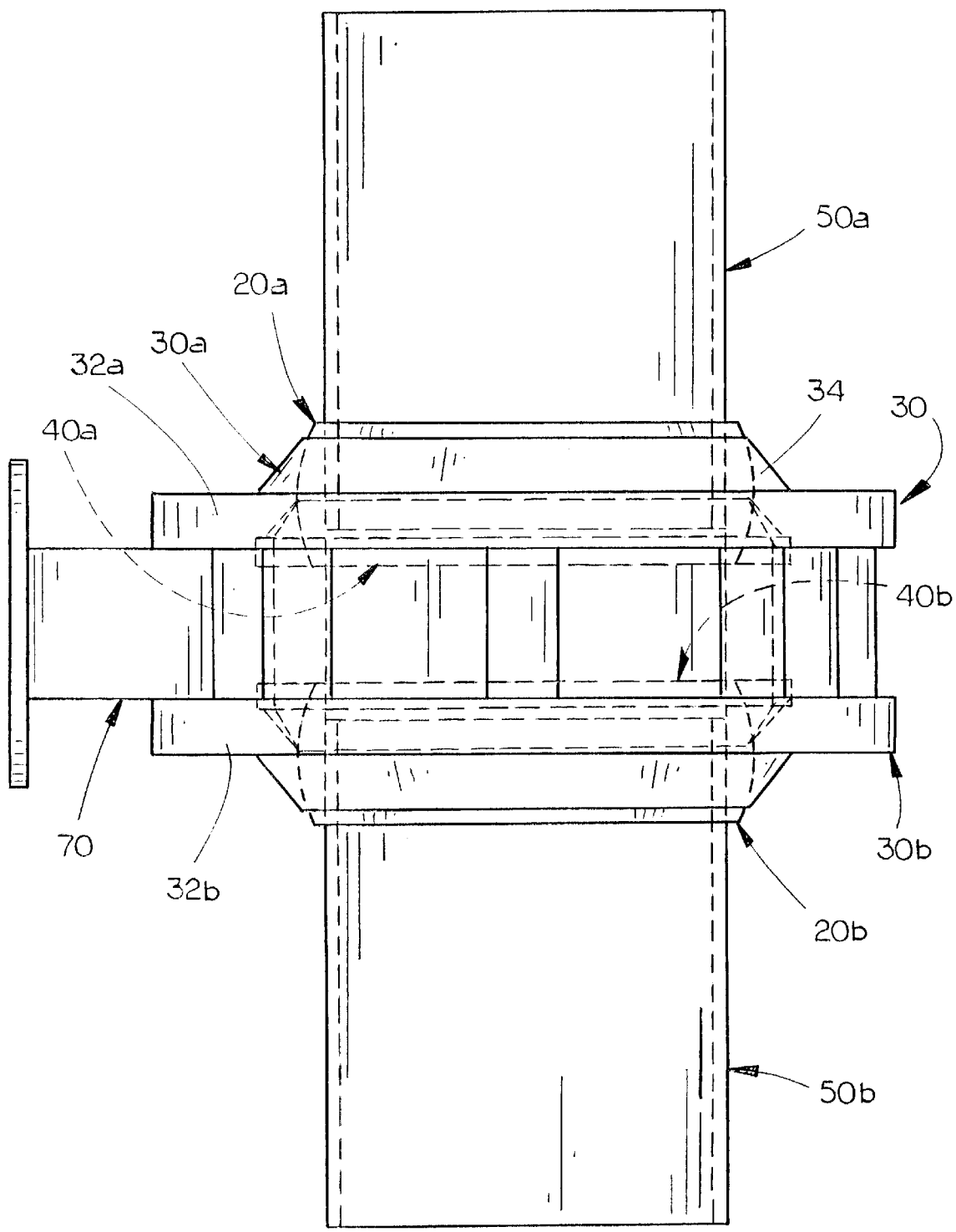
FIG. 6 is a perspective view illustrating the use of the coupling to connect a pipe to a control valve.
Figure 13:
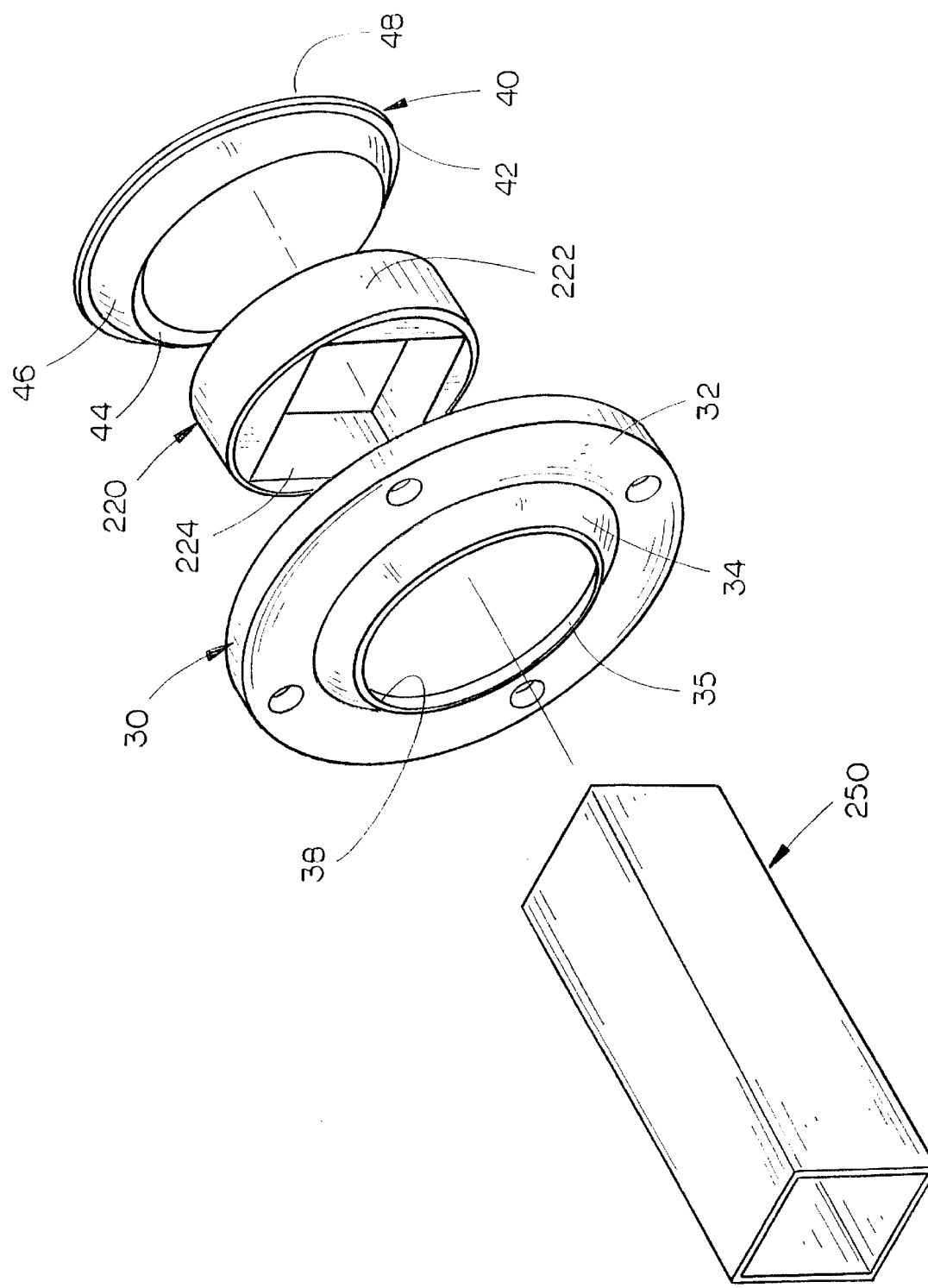
FIG. 13 is a perspective view illustrating the components of the primary embodiment of the invention including the seal block, seal flange and seal ring and how these components would be installed on the end of a coupling pipe having a non cylindrical shape.

One utilization of the first embodiment is to couple a pipe to another pipe terminating in a conventional mounting flange. This first primary use is illustrated in FIGS. 2–4. A second utilization is to couple a pipe to a conventional valve. This second preferred embodiment is illustrated in FIGS. 5–8. In a third utilization, two couplings are used as illustrated in FIG. 1 to cure an even larger misalignment. Finally, FIG. 13 illustrates how the coupling of the first embodiment may be utilized in conjunction with a non-cylindrically shaped conduit.

Figure 9:
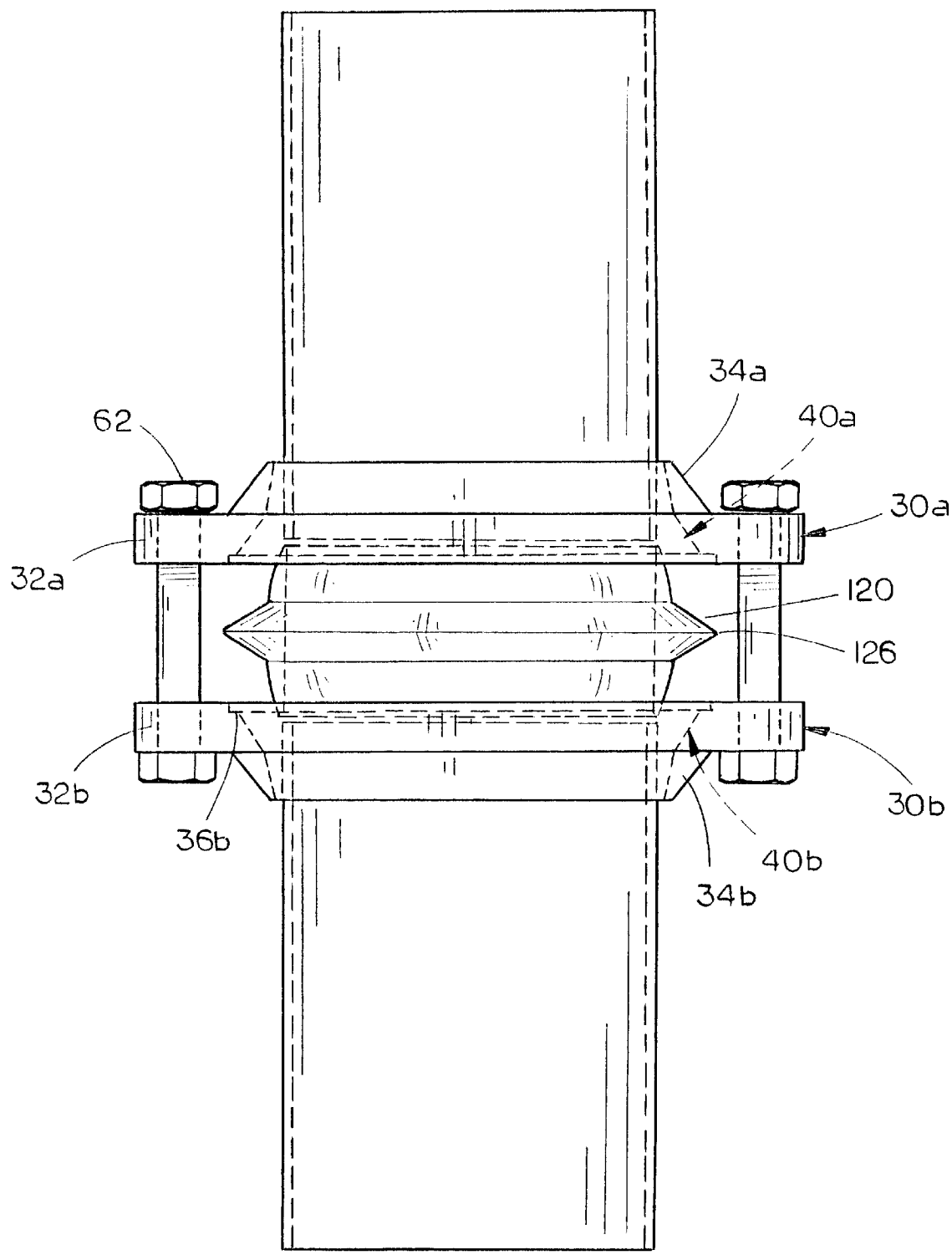
FIG. 9 is a side view illustrating yet another embodiment of the pipe coupling of the present invention, specifically to couple two aligned pipe segments.
Figure 10:
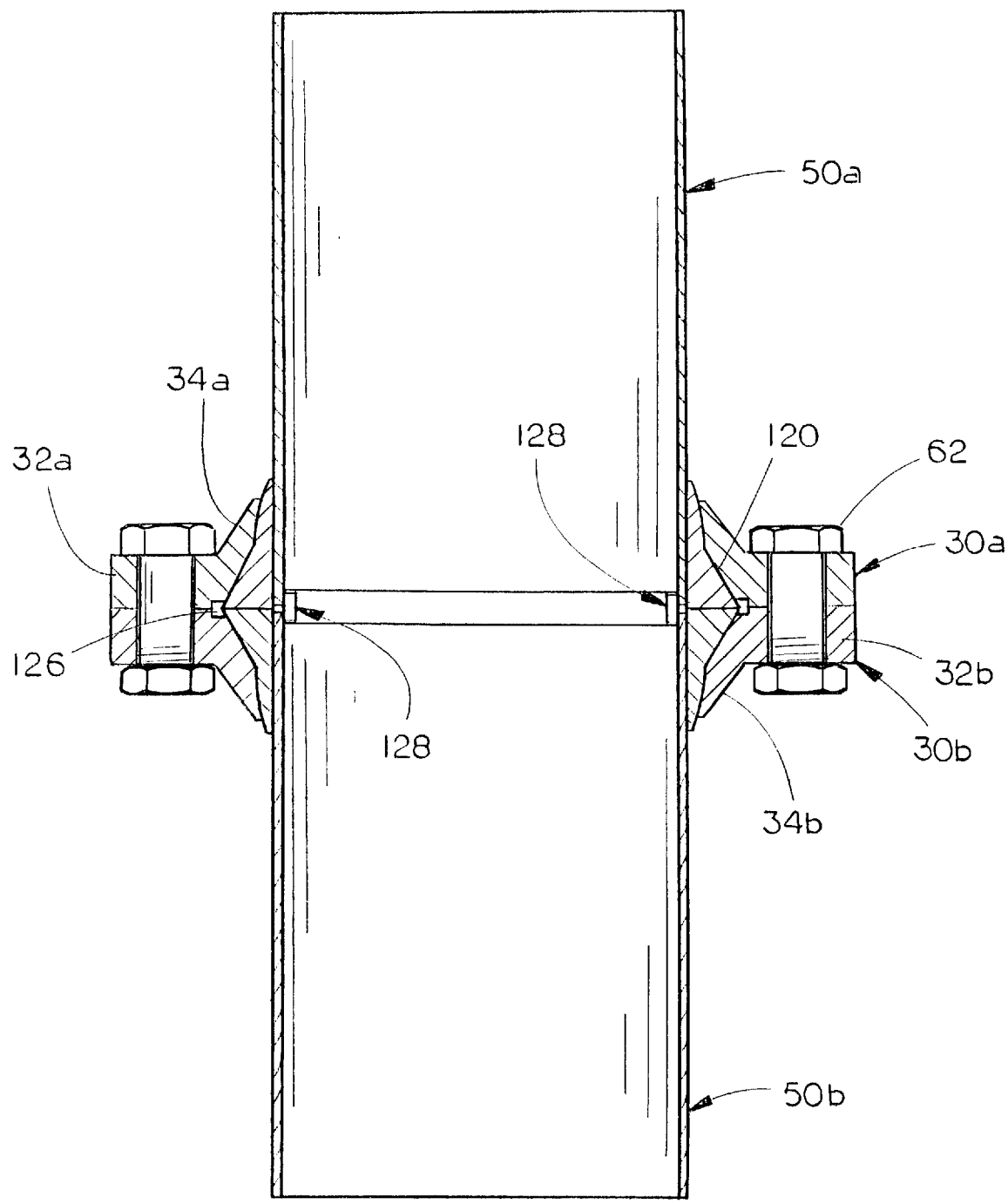
FIG. 10 is a cross-sectional side view illustrating the embodiment of FIG. 9 and with a greater degree of clarity, the interconnection of the pipes, sealing flanges and the alternative seal block.
Figure 11:
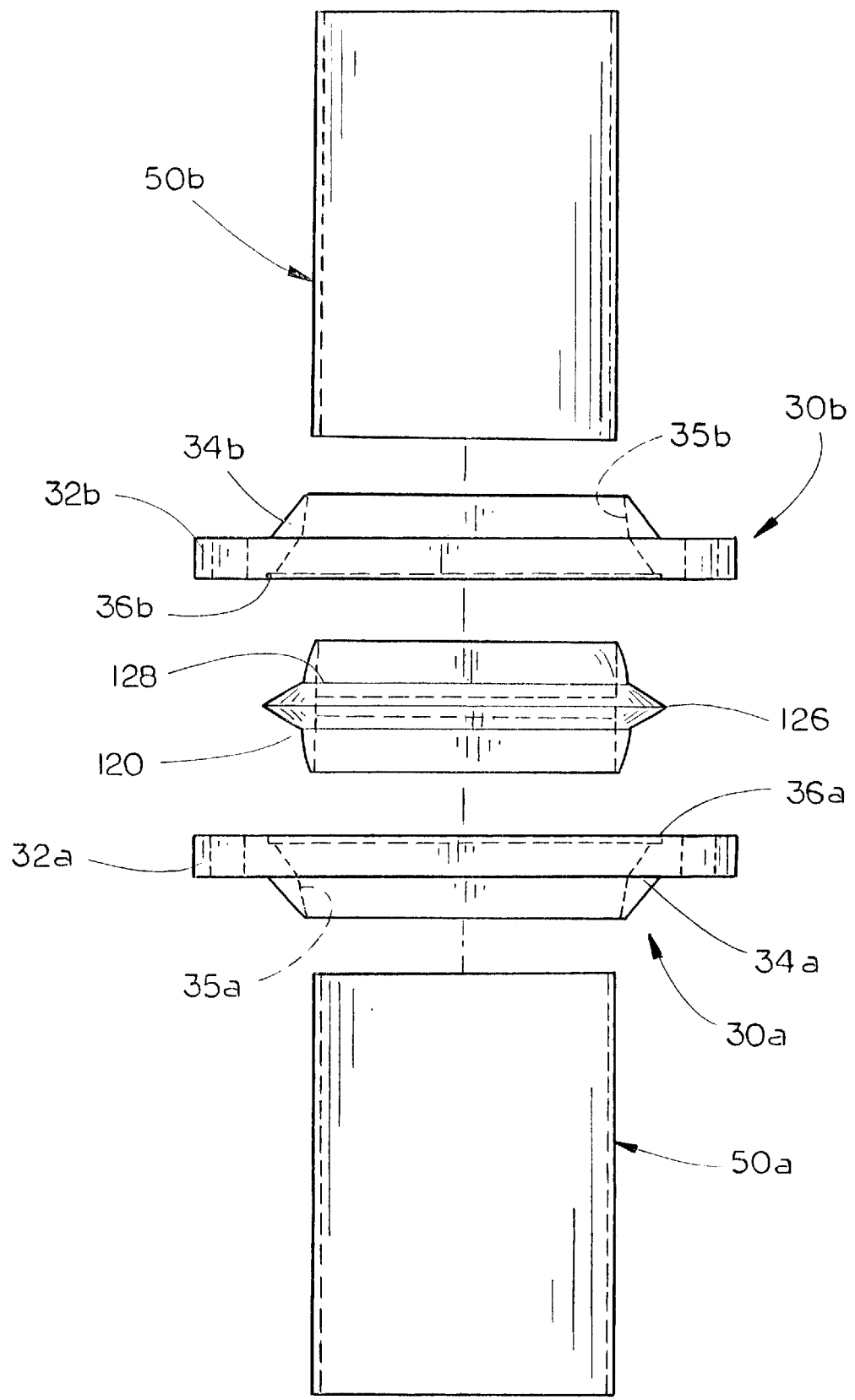
FIG. 11 is an exploded view of the embodiment illustrated in FIGS. 9 and 10 above showing how the various components are connected.

The second preferred embodiment is illustrated in FIGS. 9–11 wherein the pipe coupling of the present invention is used to couple two aligned pipe segments together.

Addressing the first embodiment illustrated in FIGS. 1–8 and 12, the pipe coupling apparatus of the present invention comprises three components, a seal block 20, a seal flange 30 and a seal ring 40. The seal flange is first slipped over the end of the pipe. Next, the seal block, which has an inside diameter substantially equal to the outside diameter of the coupling pipe, is slidably placed on the coupling end of the pipe. Owing to the substantially equivalent diameters of the seal block and pipe, a semi-tight frictional fit is achieved therebetween. Finally, the seal ring would be placed on the pipe end, over the seal block, as seen in FIG. 1.

Figure 12:
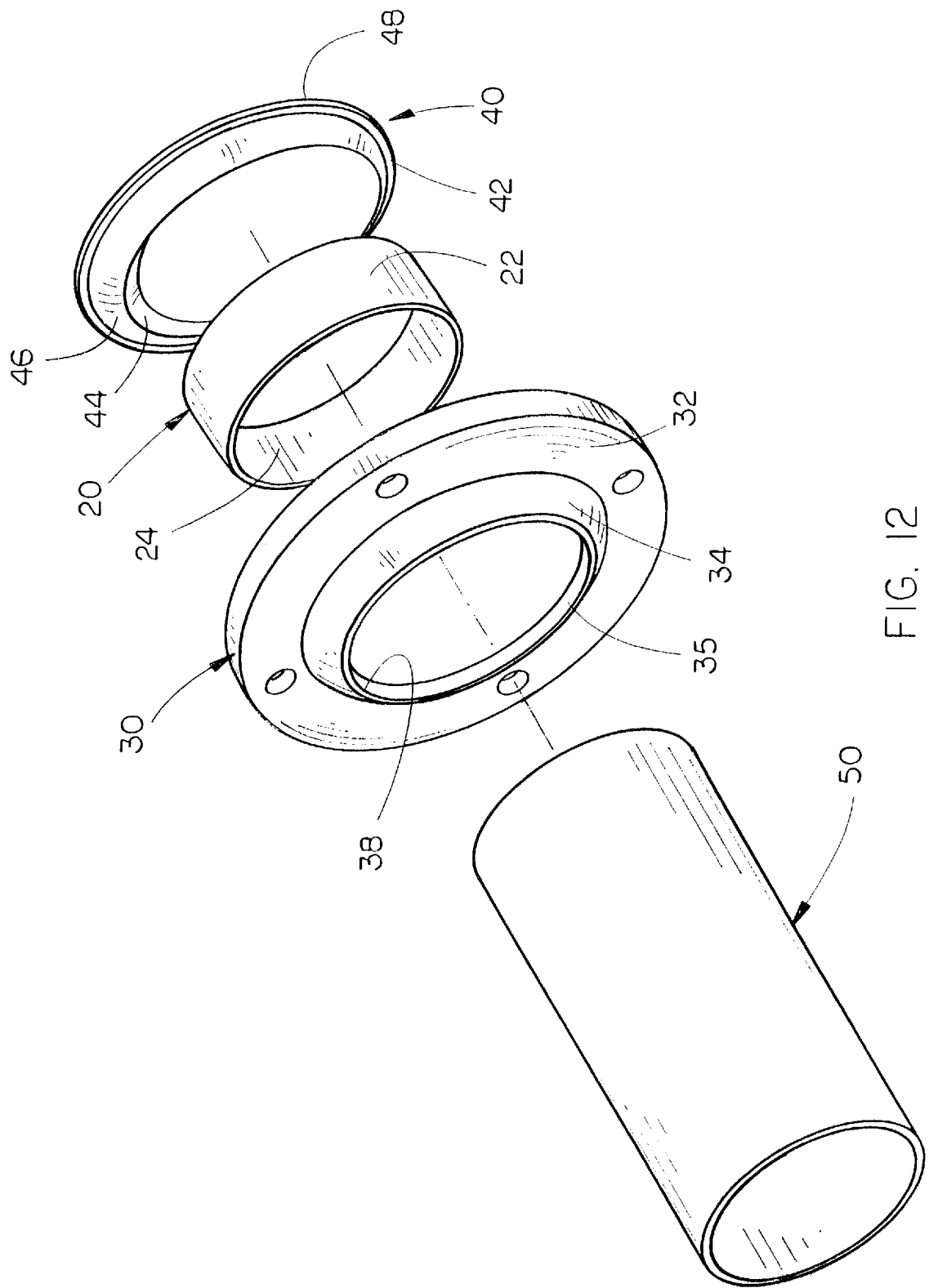
FIG. 12 is a perspective view illustrating the components of the primary embodiment of the invention including the seal block, seal flange and seal ring and how these components would be installed on the end of a coupling pipe.

The seal block has a cylindrical inner surface to match the pipe on which it is placed. The outer surface of the seal block is curved outwardly at a constant radius of curvature. This curved outer surface may be visualized as rotating a semi-circular arc through 360 degrees in a plane orthogonal to the longitudinal axis of the pipe on which the seal block is placed. Alternatively, the cross-sectional shape of the seal block may also be described as a "half moon" with the curved portion directed outwardly of the pipe. Thus, the seal block describes a "quasi-toroid of semi-circular cross-section." Cross-sectional and perspective views of the seal block shape are illustrated in FIGS. 1 and 12, respectively.

It is this curved outer surface of seal block 20 and the corresponding mating surfaces of seal flange 30 and seal ring 40 which give the invention its great utility. As described below, these mating surfaces allow the flange 30 and ring 40 to rotate and pivot relative to the seal block 20 and the conduit on which it is installed, while still maintaining contact with the outer surface of the seal block. Thus, the position of the connecting conduit may be adjusted prior to tightening the coupling to the adjoining conduit. Consequently, even if the adjoining conduit is not "square", a tight connection may still be made by making a compensating adjustment of the connecting conduit.

The sealing flange 30 has a collar 34 adapted to contact the seal block and an outer shoulder 32 adapted to connect the sealing flange 30 to a conduit such as a connecting pipe mounting flange, valve, or the like. In the preferred embodiment, the sealing flange collar 34 and shoulder 32 are integrally formed. The sealing flange collar has an inner surface 35 adapted to contact the seal block 20. This collar inside surface 35 has a radius of curvature substantially identical to that of the seal block outer surface 22. Thus, this inner collar surface 35 may be pivoted or rotated against the seal block outer surface 22 while still making contact therewith. Thus, pivotal movement of the connecting pipe 50 relative to the flange 30 may be made during assembly while permitting a tight seal between the sealing flange inside surface and the seal block when flange 30 is secured to the conduit. Additionally, the ability of the flange to be rotated about the longitudinal axis of the pipe facilitates the alignment of the connecting bolt holes.

An annular seal ring 40 having inside, outside and front surfaces 44, 46 and 48 respectively, defines a generally triangular cross-sectional shape as illustrated in FIGS. 1 and 2. The inner and outer surfaces are adapted to contact the seal block and flange collar, respectively. The front, substantially flat surface 48 of the seal ring 40 is adapted to contact a sealing member of the conduit to which the pipe 50 is being coupled. Generally this will be a connecting gasket or the like. The shape and various surfaces of the seal ring 40 are especially well illustrated in FIG. 2.

When the sealing flange 30 of the coupling is tightened against the connecting conduit, the seal ring, seal block, and sealing flange are all compressed together, achieving a tight seal. These principles will be discussed below.

FIG. 1 illustrates one utilization of the first embodiment of the present invention and the enormous utility thereof by virtue of its ability to couple two pipe segments 50a and 50b in spite of a misalignment existing between the two pipes. In the discussion which follows, reference numeral 50 will be used to refer to both pipes and T-connector pipe segments. As will be noted from the figure, each pipe 50a and 50b has associated therewith a coupling 10a and 10b. Each coupling comprises a seal block 20a and 20b, a seal flange 30a and 30b, and an annular seal ring 40a and 40b. These three components comprise the non-weld pipe coupling of this first embodiment.

Seal blocks 20a and 20b comprise inner surfaces 24a and 24b having a cylindrical shape and being of a diameter substantially equivalent to the outside diameter of the pipe on which it is mounted. As was mentioned above and is discussed in more detail below, the shape of seal block interior surface 24 is dictated by the shape of the conduit on which it is placed. For example, if the coupling is being utilized in conjunction with a rectangularly shaped conduit (e.g. FIG. 13), interior surface 24 would be rectangular.

Seal blocks 20a and 20b also comprise outer surfaces 22a and 22b which are curved outwardly at a constant radius of curvature. As mentioned, the seal block forms a figure best described as a quasi-toroid having a semicircular cross-section. Each sealing flange 30a and 30b comprises a shoulder 32a and 32b and a collar 34a and 34b. Shoulders 32a and b would have a plurality of holes drilled therein to accommodate securement bolts which function in the conventional manner to secure two flanges together. As mentioned, the ability of the flanges to be rotated facilitates the alignment of the bolt holes.

Collar 34 comprises an interior mating surface 35 (FIG. 12) having the same diameter and radius of curvature of the outer curved surface 22 of seal block 20. Thus, the interior mating surface 35 of collar 34 is adapted to mate with the outer curved surface 22 of seal block 20. Additionally, since the radius of curvatures of the two surfaces 22 and 35 are the same, flange 30 is able to both pivot and rotate along outer curved surface 22 while maintaining sealing contact therewith. This ability to pivot along the outer curved surface 22 of the seal block 20 is illustrated in the figure by the exaggerated angle between pipes 50a and 50b.

As can be seen in the figure, annular seal rings 40a and 40b comprise a generally triangular shape defined by seal block mating surface 44a and 44b, collar mating surface 46a and 46b and front gasket mating surface 48a and 48b. Identification of these various surfaces is best shown in FIG. 12. Seal ring seal block mating surface 44 has a diameter and radius of curvature substantially equivalent to the outer curved surface 22 of seal block 20. Thus, seal rings 40a and 40b are adapted for pivotal and rotational movement about seal block 20 during assembly and in a manner similar to that for sealing flanges 30a and 30b.

It will also be noted from the figure that annular seal rings 40a and 40b comprise a shoulder 42a and 42b and further that sealing flanges 30a and 30b comprise a corresponding recess 36a and 36b adapted for receipt of shoulders 42a and 42b. As will be described in more detail below, the purpose for shoulder 42a and 42b is to provide additional surface area 48, allowing for better fit and support of a flow control valve or flange mating gasket. Finally, it will be noted in the figure that at the point of junction of the two couplings, gasket 66 would be positioned in contact with seal ring gasket mating surface 48a and 48b of each respective coupling.

Once the couplings have been installed on the pipes, a plurality of bolts 62 would be inserted in the holes (not shown) positioned circumferentially around flange shoulders 32a and 32b. The bolts would then be tightened in the conventional manner drawing the two flanges 30a and 30b together. Drawing of flanges 30a and 30b together also brings gasket mating surface 48a and 48b of each annular sealing ring 40a and 40b into ever-increasing pressure contact with gasket 66 positioned therebetween. The flexibility of gasket 66 permits the tightening of bolts 62 until the shoulders 32 of flanges 30a and 30b are nearly in physical contact. The pressure contact of gasket 66 against mating surfaces 48a and 48b of the annular sealing rings 40a and 40b tends to urge the sealing rings 40a and 40b away from each other and into increasing sealing contact with its associated seal blocks 20a and 20b and flange collars 34a and b.

While a gap is shown in the figure between annular sealing ring 40 and flange collar 34, this gap is shown for illustrative purposes only and in fact the components would be in close physical contact once bolts 62 have been tightened sufficiently. Once bolts 62 are tightened, the three coupling components establish a tight seal between the pipes and their respective couplings.

It is clear from the geometry illustrated in the figure that the complimentary mating surface of the sealing block and associated sealing surfaces of the flange collar and seal ring permit pipes 50*a* and *b* to move relative to their respective flange. Thus two pipes which may not be "square" with each other may nevertheless be placed in tight sealing relation. Furthermore, the ability of the coupling components to slide along the seal block operates to cushion the pipe and coupling against vibrations occurring in the system and the stresses associated therewith. These system vibrations and stresses might otherwise lead to fractures or failures in the system. Thus, the coupling of the present invention provides a coupling of greater longevity.

FIG. 12 is an exploded perspective view of the components utilized in the first embodiment namely, a rotationally and pivotally movable coupling adapted to couple conduits in a situation where it might be desirable to adjust the conduit position relative to the mounting flange. As seen in the figure, the components of the coupling comprise a sealing flange 30, a seal block 20, and an annular sealing ring 40. These components are placed on the coupling end portion of a conduit such as a pipe 50.

According to the teachings of the present invention, the sealing flange 30 would first be slipped onto the end of pipe 50, after which the seal block 20 would then be slipped over the pipe end. As mentioned above, the inside diameter of seal block 20 is substantially equal to the outside diameter of pipe 50. Thus, a substantially friction-tight fit may be achieved between pipe 50 and seal block 20. The seal block 20 is slipped onto pipe 50 until the front surface of seal block 20 and the end of pipe 50 are co-registered. The annular seal ring 40 would then be placed over the front of seal block 20 while simultaneously moving the sealing flange 30 into contact with the opposite end of the seal block. The flange, seal block and seal ring are thus "hand tightened" and ready for installation to another conduit as described below.

As mentioned above, the radius of curvature of collar 34, inside surface 35 of sealing flange 30 and the inner surface 44 of annular seal ring 40 are substantially equal to the outer curved surface of seal block 20. Thus, the annular sealing ring 40 and flange 30 are able to pivot and/or rotate relative to seal block 20 while still maintaining a tight seal therewith. This ability to accommodate relative motion between the seal block 20, seal ring 40, and sealing flange 30 is what gives the coupling apparatus of the present invention its ability to accommodate misalignment between consecutive pipe segments by allowing the pipe to be moved relative to the flange (FIGS. 1 and 4).

FIG. 2 is a sectional side view illustrating another utilization of the first embodiment of the coupling apparatus of the present invention. As illustrated, the coupling is used to join a pipe segment to a conventional flange. The coupling could be either between two individual pipe segments or between a coupling pipe segment and a T-connector. In either case, the operation of the coupling is identical. Initially, sealing flange 30 is placed over pipe 50. Seal block 20 is then slipped over the end of pipe 50 and in frictional engagement therewith. Annular sealing ring 40 is then placed over the front portion of pipe 50 and is hand compressed against seal block 20 and sealing flange 30. Flange 30 would then be placed adjacent mounting flange 64 causing forward mating surface 48 of sealing ring 40 to contact sealing gasket 66 associated with either a valve (FIGS. 4–8) or conventional mounting flange 64 fastened to the end of pipe 60 to which pipe segment 50 is to be coupled, in order to facilitate the seal between pipes.

Bolts 62 would then be used to releasably join sealing flange 30 and conventional mounting flange 64 in the usual manner. Tightening of bolts 62 causes further pressure to be placed on annular sealing ring 40 by gasket 66. This increased compression causes an ever tighter seal to be formed between annular sealing ring 40, sealing flange 30 and the seal block 20 compressed therebetween. Since the radius of curvature of seal block 20 is equivalent to the radius of curvature of the mating surfaces 44 and 35 of annular sealing ring 40 and collar 34 of flange 30, respectively, pipe 50 may be rotated and/or pivoted relative to flange 30 while still maintaining a tight fit between the flange 30, seal block 20, seal ring 40, and pipe 50.

Looking more closely at annular seal ring 40 in FIG. 2, it will be noticed that annular seal ring 40 comprises a shoulder 42. It will also be noted from FIG. 2 that sealing flange 30 comprises a recess 36 in shoulder 32 adapted to receive shoulder 42. This shoulder 42 of annular seal ring 40 provides additional sealing surface area for front mating surface 48. This additional sealing area provides for more complete support of a sealing gasket such as that associated with a valve or conventional mounting flange 64.

FIGS. 3 and 4 are side and sectional views respectively of one example of a typical working environment in which the non-weld coupling of the present invention would be utilized. However, utilization of the invention is in no way limited to this environment but rather is suitable for any situation where two conduits are transferring material from one point to another.

Typically, in the environment of FIG. 3, a railroad car, truck trailer, or other container 80 will be used for the transportation of materials. These materials may be either in liquid form, such as gasoline or the like, or solid, such as grain, flour and the like. In either case, the trailer 80 comprises a hopper 82 in which the material is stored. Typically, a series of boots 84*a–c* will be positioned in the lower portion of the hopper 82 so that the material will gravitate into one of the boots as the material is withdrawn from the hopper 82. Each boot is constructed with downwardly and inwardly tapered walls which operate to focus the material at the base of the boot. Each of the boots 84*a–c* will have connected at the focus, an outlet means. Conventionally, these outlet means typically will consist of downwardly directed hopper boot outlet pipes 86*a–c*. There will also generally be a flow control valve 70 attached to the end of each outlet pipe to control the flow therefrom.

In the usual design, each of the outlet pipes and associated flow control valves will be connected to a single discharge pipe 90 through a series of T-connectors 50. The purpose of the discharge pipe 90 is to provide a single point from which the discharged material can be collected. As mentioned above, in the construction of transport containers, boots 84*a–c* are individually welded to the bottom of hopper 82. Furthermore, boots 84*a–c* have outlet pipes 86*a–c* positioned at the base of each boot. As a result of the individual welding of boots 84*a–c*, it is the usual situation that the outlet pipes 86*a–c* are not in alignment with one another. The usual result of misalignment is lateral displacements, either side/side or front/back. This misalignment of outlet pipes 86*a–c* presents a major obstacle to the connection of a single discharge pipe 90. Since the length of hopper 82 is quite large, a misalignment of the forwardmost and rearward most pipes of only a couple of degrees can result in quite a large physical displacement. As mentioned above, in order to accommodate this misalignment, it is frequently necessary for the flange on a conventional T-connector 50 to be welded at an angle to the T-connector corresponding to the amount of misalignment of the outlet pipe to which that T-connector is being connected. This makes each T-connector a special fitting component adapted to fit a specific outlet pipe. Clearly this creates a frustrating and time-consuming construction process.

FIGS. 3 and 4 show side views of the coupling apparatus of the present invention used to connect a single discharge pipe 90 to a series of discharge boots 84*a–c* associated with a trailer 80. FIG. 3 illustrates a series of three such discharge boots 84*a–c* associated with a hopper 82. FIG. 4 is an enlarged view of one of these discharge boots 84*a* illustrating in more detail the utilization of the coupling apparatus 10 of the present invention to connect an outlet pipe to the discharge pipe and illustrating how a misalignment would be cured without the need for special fitting and welding of the T-connector flange.

As mentioned above, depending on the material being dispensed (e.g. solids), it may also be desirable to have discharge pipe 90 attached to a source of air so as to facilitate the dispensing of material by introducing a volume of compressed air in discharge hose or pipe 90. In one typical embodiment, an air pipe 92 would be connected at one end of discharge pipe 90 as indicated in the figure. The other end of the air pipe 92 would be connected to a source of compressed air (not shown). Connection of air pipe 92 to discharge pipe 90 has the potential for yet other misalignment problems. As mentioned above, the utility of the present invention is not limited to use in situations involving transport and discharge of solid or liquid materials but is also capable of being utilized with gases. Therefore, the coupling apparatus of the present invention may also be used to couple the air pipe 92 and discharge pipes 90 in a manner identical with that described above.

FIG. 4 illustrates an enlarged side view of the connection of the central discharge pipe 90 to one of the outlet pipes 86*a* using T-connector 50*a*. Many different means are available for connecting a central discharge pipe 90 to the discharge boots. Commonly, discharge pipe 90 and outlet pipe 86*a* will be connected through a T-connector 50. Additionally, a flow control valve 70 such as a butterfly valve, will also be used in order to control the flow of material out of tank 80. As mentioned above, the outlet pipe 86*a* would generally be welded to the base of a respective discharge boot 84*a*. These outlet pipes generally come in standard shapes and sizes such as 3, 4 and 5 inch diameters. The present invention is designed to operate on these standard pipe sizes but is certainly not limited thereto. In fact, the principles associated with the coupling apparatus of the present invention are adaptable to use on pipes of any diameter, shape or configuration. The outlet pipe 86*a* will typically terminate in a conventional mounting flange 64 which would be welded to the output end of the outlet pipe 86*a* as shown. This mounting flange 64 would have a series of holes drilled therein in order to facilitate the connection to other flanges in the conventional manner.

As mentioned, a flow control valve 70 would usually be associated with each discharge boot so as to provide a means for controlling the flow of material therefrom. One such flow control valve 70, illustrated in FIG. 4 is a butterfly valve, such as a Keystone valve. Many other flow control valves may be utilized. Regardless of the flow control valve configuration used, it will generally comprise a pair of connecting seal gaskets 72 and 74 enabling a tight seal to be made between the valve and a pair of flanges. The flow control valve 70 will also comprise a series of circumferentially spaced holes for receiving bolts 62 so that the flow control valve may be releasably and compressably secured between the pair of flanges 64 and 30 in the normal manner. Connecting seal gaskets 72 and 74 may be constructed of either conventional rubber, paper, or cork gaskets or the like, depending on the particular material being transported and discharged.

The other side of flow control valve 70 is connected to T-connector 50*a* used to connect outlet pipe 86*a* to central discharge pipe 90. It is T-connector 50*a* which would be connected to flow control valve 70 using the pipe coupling 10 of the present invention. Use of the pipe coupling 10 permits the connection to a central discharge pipe, even if the outlet pipe 86 deviates from the vertical axis without the need for specially fabricating the T-connector.

As mentioned above, the coupling 10 comprises a seal block 20 adapted to fictionally engage and circumferentially surround the input end of T-connector 50*a* as shown. As mentioned, the construction of sealing flange 30 and seal block 20 permits both rotational and pivotal movement of flange 30 relative to T-connector 50*a* during assembly while maintaining a tight connection therewith once flange 30 has been tightened against flange 64. In the preferred embodiment, collar 34 is formed integrally with shoulder portion 32 of flange 30. Flange shoulder portion 32 comprises a series of circumferentially spaced holes which provide a means for receiving bolts 62 therethrough. As with the conventional flanges, when bolts 62 are positioned within flanges 64 and 30 and flow control valve 70, as illustrated in the figure, they provide a means for compressing the two flanges 64 and 30 against opposite faces of flow control valve 70, whereupon a tight seal may be effected therebetween.

While the figure illustrates that a small gap exists between the flanges and the flow control valve, and between seal ring and flange, these gaps are shown for illustrative purposes only to illustrate the various components of the coupling. In practice of course, the flanges would be in physical contact with opposite sides of the flow control valve 70 flattening gaskets 72 and 74. Annular sealing ring 40 comprises an inner mating surface 44 adapted to slide along the curved outer surface 22 of seal block 20 achieving a tight fit therebetween. Seal ring 40 comprises a flat mating surface 48 adapted to contact a seal gasket such as 72. When bolts 62 are tightened, compressing flanges 64 and 30 against opposite faces of flow control valve 70, seal gasket 72 will compress seal ring 40 against collar 34 of sealing flange 30 and against seal block 20 forming a substantially rigid tight seal coupling.

It will be noted from the geometry illustrated in the figure that the adjoining flanges 64 and 30 may remain abutted to opposite faces of valve 70 while still permitting T-connector 50*a* to be pivoted or rotated relative thereto. Thus, even if pipe 86*a* and flange 64*a* are not "square" with discharge pipe 90, the ability of T-connector 50*a* to be pivoted and rotated allows this discontinuity to be negated.

Clearly the degree of misalignment or discontinuity which can be accommodated is increased if the conventional mounting flange 64*a* associated with outlet pipe 86*a* is also replaced with the coupling of the present invention. This two-coupling configuration is illustrated in FIG. 1 and below in connection with a valve in FIGS. 5–8.

Another means by which the amount of misalignment or discontinuity may be accommodated is by using seal block, ring and flange with different radii of curvature. For example, it has been found that a radius of curvature of approximately one and three-quarters inches will negate misalignments of between approximately zero and four degrees. Alternatively, a radius of curvature of approximately three inches will negate a misalignment of between approximately zero and six degrees. Therefore, different ranges of misalignment may be accommodated simply by changing out coupling components. Since the coupling does not require welding, this change out may be easily accomplished.

Figure 7:
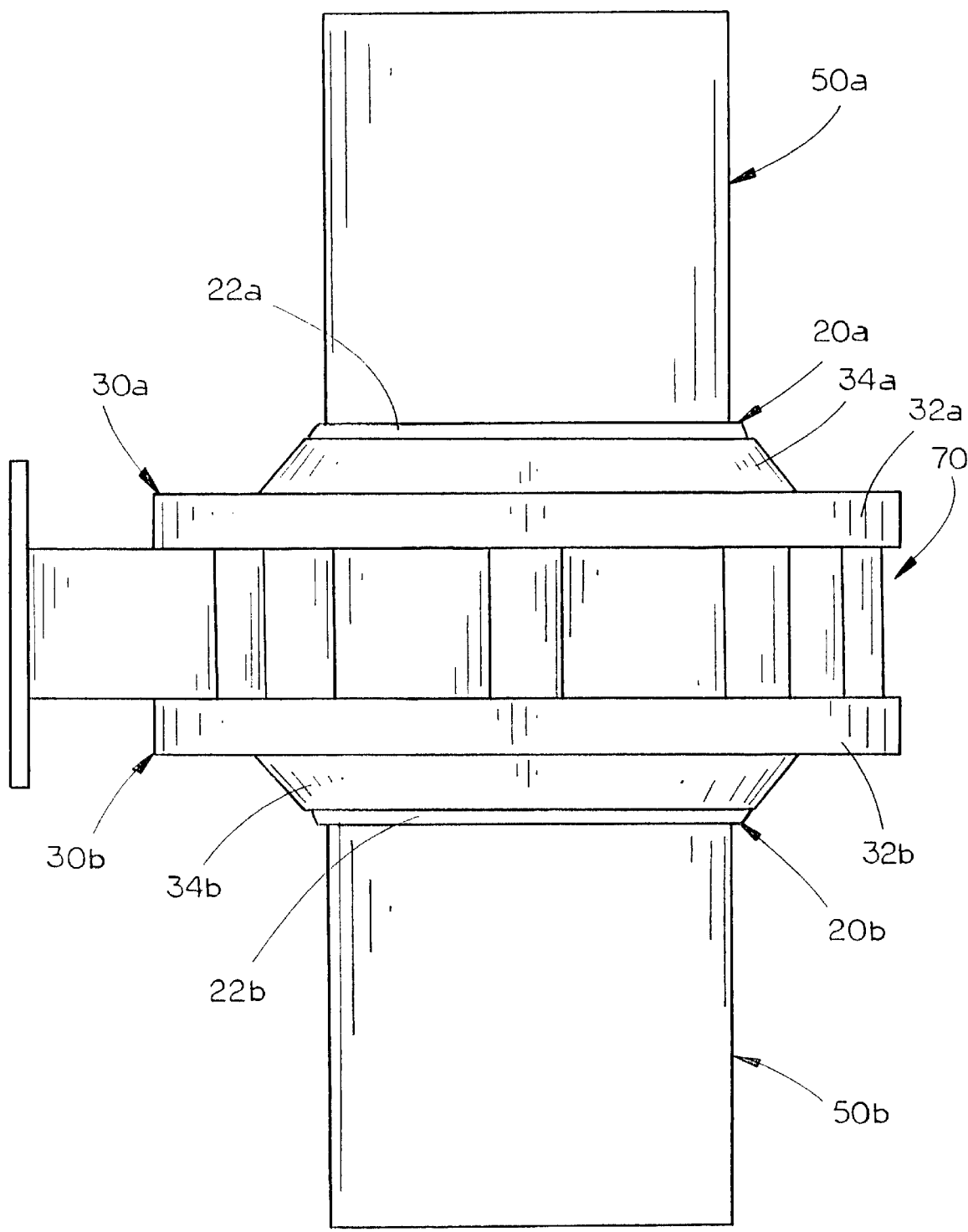
FIG. 7 is a side view illustrating the use of the present coupling to connect pipes to either side of the control valve.
Figure 8:
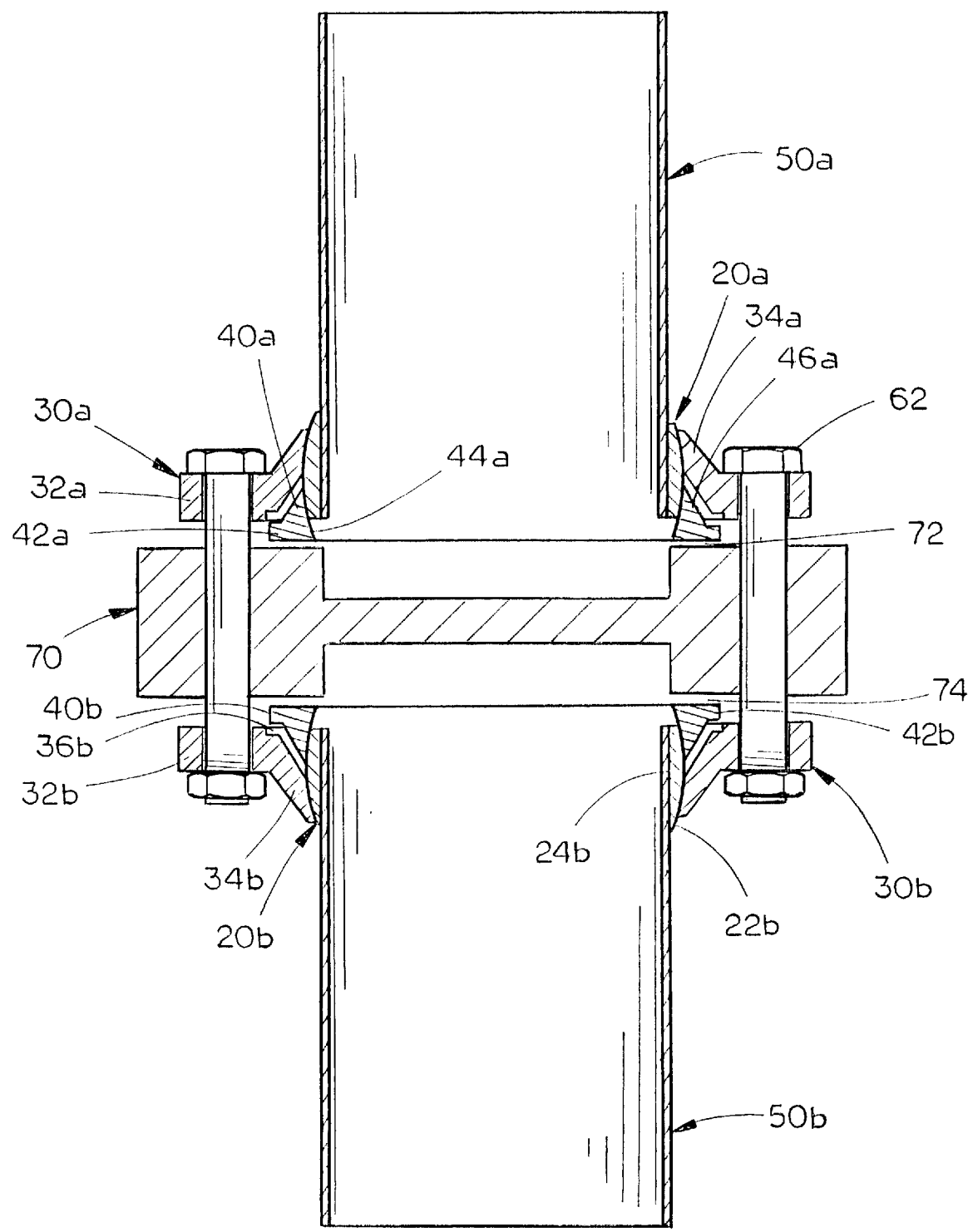
FIG. 8 is a cross-sectional side view illustrating use of the present coupling to connect pipes to either side of the control valve.

FIGS. 5–8 illustrate the first embodiment of the invention in another of its common utilizations, namely the connection of two pipe segments to a conventional valve, such as a Keystone butterfly valve. It will be remembered from the discussion above in connection with FIG. 4 that a flow control valve 70 such as a Keystone butterfly valve will comprise sealing gaskets 72 and 74 on opposite sides of the valve 70. When two pipe segments are to be joined to a valve using the coupling apparatus of the present invention, the coupling would replace the conventional flange 64 illustrated above. Each sealing gasket 72 and 74 of valve 70 will contact the flat gasket mating surface 48 of a respective one of the annular sealing rings 40. Securement bolts 62 would be tightened in the conventional manner described above in connection with FIG. 4 causing the sealing flanges 30 to be compressed against opposite sides of valve control 70 as shown in FIGS. 7 and 8. As mentioned, compression of annular sealing ring 40 against the sealing gasket 72 or 74 also tightens sealing flange 30 and seal block 20. This compression action will effect a tight seal between the flanges, control valve 70 and the respective pipe segments.

Again it should be noted that in FIG. 8, a gap is shown to exist between the sealing flanges 30 and the flow control valve 70 in order to illustrate the positioning of the elements and especially the sealing gasket 72 and 74. As mentioned above, when bolts 62 have been completely tightened, sealing flanges 30 will be in physical contact with flow control valve 70 except for a small gap corresponding to the flattened seal gasket 72 and 74. As mentioned above in connection with FIG. 2, it will be noted from FIG. 8 that the annular seal rings 40 each comprise a shoulder 42 and that the sealing flange comprises an indentation 36 which corresponds to shoulder 42 to receive and support shoulder 42. Additionally, shoulder 42 on annular sealing ring 40 provides additional sealing area on front mating surface 48 providing additional support and sealing area for the valve seal gaskets 72 and 74.

FIGS. 9–11 illustrate the other primary embodiment of the present invention, namely the connection of two straight pipes. In this embodiment, the two pipes being connected are in substantial alignment. The coupling comprises sealing flanges 30a and 30b which are similar to the sealing flange 30 discussed above. The major distinction and point of differentiation of the straight pipe sealing coupling 100 with that discussed above is the design of sealing block 120 and the lack of any seal rings. FIG. 9 illustrates the embodiment in assembled, but "non-compressed", configuration to better illustrate the components. FIG. 10 is a sectional view showing the embodiment in assembled and compressed form. FIG. 11 is an exploded view.

As seen from the figures, especially FIGS. 10 and 11, the seal block 120 of this embodiment comprises a single unit. As with seal block 20 described above, seal block 120 comprises a cylindrical interior shape having an inside diameter substantially equivalent to the outside diameter of pipes 50a and 50b such that a friction tight fit may be achieved therebetween when the ends of pipes 50a and 50b are inserted therein. Also discussed above in connection with seal block 20, the inner surface of seal block 120 would be shaped to correspond with the shape of the conduit on which it is being mounted, e.g. cylindrical, rectangular, and the like. Additionally, the seal block 120 comprises curved outer portions 122a and 122b having a constant radius of curvature as with the previously described seal blocks.

As will be recalled from the discussion above, the interior mating surface 35a and 35b of collars 34a and 34b of sealing flanges 30a and 30b are adapted to slidably move along this curved outer surface 122a and 122b. Additionally, seal block 120 comprises a raised center portion 126. It will be seen from the figure that this raised center portion 126 is adapted to conform with the inner mating surface 38a and 38b of the sealing flanges 30a and 30b. As described above, bolts would be used in the conventional manner to tighten the flanges together, compressing the flanges against seal block 120 and against pipes 50a and 50b, thereby creating a tight seal.

As was mentioned above, the couplings of the present invention are adapted to be used on conduits of any shape. FIG. 13 illustrates one alternative use of the coupling of the first embodiment with a non-cylindrical shaped conduit. For purposes of illustration, the coupling is shown for installation on a rectangularly shaped conduit 250. As mentioned above, use of the coupling is not limited to conduits having a cylindrical or rectangular shape as indicated in the figures. Rather, it is equally well suited for use on conduits of many shapes including hexagonal or even more non-conventional shapes. The operation of the coupling is identical to that described above in connection with the first embodiment. The only difference in the coupling components is the shape of the interior seal block surface 224 of seal block 220 which contacts the conduit 250 on which it is being mounted. As seen in the figure, the shape of the interior surface 224 is designed to match in shape and size the outer surface of the conduit 250. The remaining components, annular seal ring 40 and flange 30 are identical to those described above. As discussed, the seal block 220 is adapted to achieve a friction-tight fit on conduit 250. Flange 30 and annular seal ring 40 are adapted for pivotal and rotational movement along the outer surface 222 of seal block 220 in the manner discussed above, allowing flange 30 to move relative to conduit 250.

It is apparent that numerous other modifications and variations of the present invention are possible in view of the above teachings. For example, as mentioned, the coupling can be used to couple pipes transmitting liquids, solids, or gases. Consequently, its environment of use spans areas from transport to steam generation plants, to irrigation systems. Additionally, as was mentioned above, the amount of misalignment which may be accommodated can be adjusted using components with different radii of curvature. Since the coupling components are not welded or otherwise permanently attached to the pipe, installation and change out is quick and easy. Additionally, the coupling may be designed for utilization on a variety of conduit shapes and is not limited to the cylindrical and rectangular shapes illustrated and discussed above. For example, the coupling may be used on hexagonal and other non-conventional shapes. As discussed in detail above, the coupling components function in the same manner the only difference being the shape of the seal block interior, conduit mating surface which is shaped and sized to correspond to the conduit on which it is being placed.

Therefore, it is to be understood that the above description is in no way intended to limit the scope of protection of the claims and it is representative of only one of several possible embodiments of the present invention.

There has thus been shown and described an invention which accomplishes at least all the stated objectives.

I claim:

1. A universal pipe coupling for providing a tight fit between a first pipe and one of a valve and a second pipe, the first pipe being generally cylindrical in shape and having a first end, said valve and second pipe each having a connecting seal gasket thereon, the pipe coupling comprising:

an annular seal block describing a quasi-toroid of generally semi-circular cross-section and having a generally cylindrical inner surface, and an outer surface defined by a radius of curvature, the seal block having a predetermined inside diameter for a friction fit on the first pipe first end;

a seal flange having a shoulder portion extending radially outwardly from an annular collar portion, the collar portion having an outer surface and an inner surface, the inner surface having a radius of curvature substantially the same as the seal block outer surface, said seal flange collar inner surface being in rotational, pivotal, slidable engagement with the seal block outer surface;

an annular seal ring having an arcuate inner surface, an outer surface, and a front surface, the seal ring inner surface having a radius of curvature substantially the same as the seal block outer surface and in rotational, pivotal, slidable contact with the seal block outer surface, forwardly of the seal flange;

said seal ring outer surface having a shape matching the flange collar outer surface and being in rotational, slidable engagement therewith; and means for releasably securing the flange shoulder to one of said valve and second pipe with the seal ring front surface in sealed engagement with the connecting seal gasket;

said seal ring inner and outer surfaces forming a wedge between the collar inner surface and seal block outer surface radially compressing the seal block when the flange shoulder is secured to one of said valve and second pipe.

2. The universal pipe coupling of claim 1 wherein said annular seal ring front surface is substantially flat.

3. The universal pipe coupling of claim 2 wherein said seal block is constructed of nylon.

4. The universal pipe coupling of claim 2 wherein said seal block is constructed of plastic.

5. The universal pipe coupling of claim 2 wherein said seal block is constructed of rubber.

6. The universal pipe coupling of claim 2 wherein said flange and seal ring are constructed of aluminum.

7. The universal pipe coupling of claim 2 wherein said flange and seal ring are constructed of plastic.

8. The universal pipe coupling of claim 2 wherein a center axis is defined for said first and second pipes as the longitudinal axis of the respective pipe and wherein said center axes of said first and second pipes are not co-linear, the angular difference between said center axes defining an angle of misalignment.

9. The universal pipe coupling of claim 3 wherein said misalignment is between zero and six degrees.

10. The universal pipe coupling of claim 1 wherein said flange collar and shoulder are integrally formed.

11. A universal pipe coupling for providing a tight fit between aligned first and second pipes, comprising:

an annual seal block having forward and rearward ends, a generally cylindrical inner surface, a radially raised center portion circumferentially surrounding the seal block and curved outer surfaces extending from the ends to the raised center portion;

first and second annular sealing flanges, each having a shoulder portion extending radially outwardly from an annular collar, each collar having an outer surface and an inner surface;

the first flange collar inner surface having a radius of curvature substantially the same as the seal block forward end outer surface, said first flange collar inner surface in rotational, pivotal, slidable engagement with the seal block forward end outer surface prior to final assembly;

the first flange collar outer surface having a shape matching a forward half of the seal block raised center portion and being in rotational, slidable engagement therewith;

the second flange collar inner surface having a radius of curvature substantially the same as the seal block rearward end outer surface, said second flange collar inner surface in rotational, pivotal, slidable engagement with the seal block rearward end outer surface prior to final assembly;

the second flange collar outer surface having a shape matching a rearward half of the seal block raised center portion and being in rotational, slidable engagement therewith;

means for releasably securing the first and second flange shoulders together, with the flange collar inner and outer surfaces contacting the respective seal block outer surfaces and raised center portion, and radially compressing the seal block on the ends of the first and second pipes;

said seal flange collar outer surfaces arranged to radially compress the seal block when the first and second pipes are inserted within the seal block and the flange shoulders are secured together.

12. In combination:

a generally cylindrical pipe with a first open end;

a valve having first and second faces and first and second sealing gaskets secured to the faces; and a universal pipe coupling connecting the valve and pipe first end, comprising:

an annular seal block having a cylindrical inner surface in friction fit engagement on the pipe first end and a curved outer surface;

an annular seal flange having a shoulder portion extending radially outwardly from an annular collar portion, the collar portion having an outer surface and an inner surface, the inner surface having a radius of curvatures substantially the same as the seal block outer surface, said seal flange collar inner surface in rotational, pivotal, slidable engagement with the seal block outer surface;

an annular seal ring having an arcuate inner surface, an outer surface, and a front surface, the seal ring inner surface having a radius of curvature substantially the same as the seal block outer surface and in rotational, pivotal, slidable contact with the seal block outer surface, forwardly of the seal flange;

said seal ring outer surface having a shape matching the flange collar outer surface and being in rotational, slidable engagement therewith;

said seal ring inner and outer surfaces forming a wedge between the collar inner surface and seal block outer surface radially compressing the seal block when the flange shoulder is secured to said valve; and means for releasably securing the flange shoulder to the valve with the seal ring front surface in sealed engagement with the valve first face gasket.

13. The combination of claim 12, further comprising:

a second pipe having an open end;

a mounting flange secured proximal the second pipe open end; and means for releasably securing the mounting flange in sealed engagement with the valve second face gasket.

14. The combination of 13 further comprising:

a material transport having at least one outlet; and said second pipe being connected to said outlet and in communication therewith.

15. The combination of claim 12, further comprising:

a second cylindrical pipe, having an open end;

a second universal coupling connecting the second pipe to the valve, comprising:

an annular seal block having a cylindrical inner surface in friction fit engagement on the second pipe open end and a curved outer surface;

an annular seal flange having a shoulder portion extending radially outwardly from an annular collar portion, the collar portion having an outer surface and an inner surface, the inner surface having a radius of curvatures substantially the same as the seal block outer surface, said seal flange collar inner surface in rotational, pivotal, slidable engagement with the seal block outer surface;

an annular seal ring having an arcuate inner surface, an outer surface, and a front surface, the seal ring inner surface having a radius of curvature substantially the same as the seal block outer surface and in rotational, pivotal, slidable contact with the seal block outer surface, forwardly of the seal flange;

said seal ring outer surface having a shape matching the flange collar outer surface and being in rotational, slidable engagement therewith;

said seal ring inner and outer surfaces forming a wedge between the collar inner surface and the seal block outer surface and radially compressing the seal block into the second pipe when the flange shoulder is secured to the valve;

means for releasably securing the second coupling flange shoulder to the valve with the seal ring front surface and seal engagement with the valve second face gasket.

16. The combination of claim 15 further comprising:

a material transport having at least one outlet; and said second pipe being connected to said outlet and in communication therewith.

17. In combination:

a first generally cylindrical pipe having an open end;

a second pipe having an open end and a mounting flange secured proximal the open end of said second pipe; and a universal pipe coupling connecting the open ends of the first and second pipes, comprising:

an annular seal block having a cylindrical inner surface in friction fit engagement on the first pipe open end and a curved outer surface;

an annular seal flange having a shoulder portion extending radially outwardly from an annular collar portion, the collar portion having an outer surface and an inner surface, the inner surface having a radius of curvature substantially the same as the seal block outer surface, said seal flange collar inner surface in rotational, pivotal, slidable engagement with the seal block outer surface;

an annular seal ring having an arcuate inner surface, an outer surface, and a front surface, the seal ring inner surface having a radius of curvature substantially the same as the seal block outer surface and in rotational, pivotal, slidable contact with the seal block outer surface;

said seal ring outer surface having a shape matching the flange collar outer surface and being in rotational, slidable engagement therewith;

said seal ring inner and outer surfaces forming a wedge between the collar inner surface and seal block outer surface and radially compressing the seal block when the flange shoulder is secured to said second pipe;

a gasket position between the second pipe flange and the sealing flange front surface; and means for releasably securing the flange shoulder to the second pipe flange with the seal ring front surface in sealed engagement with the second pipe gasket.

18. The universal pipe coupling of claim 17 wherein a center axis is defined for said first and second pipes as the longitudinal axis of the respective pipe and wherein said center axes of said first and second pipes are not co-linear, the angular difference between said center axes defining a angle of misalignment.

19. The universal pipe coupling of claim 18 wherein said angle of misalignment is between zero and six degrees.

20. In combination:

a first pipe having an open end;

a second pipe having an open end, and oriented generally coaxial with the first pipe;

a universal pipe coupling connecting the open ends of the first and second pipes, comprising:

an annular seal block having forward and rearward ends, a generally cylindrical inner surface, a radially raised center portion circumferentially surrounding the seal block, and curved outer surfaces extending from the ends to the raised center portion;

first and second annular sealing flanges, each having a shoulder portion extending radially outwardly from an annular collar, each collar having an outer surface and an inner surface;

the first flange collar inner surface having a radius of curvature substantially the same as the seal block forward end outer surface, said first flange collar inner surface in rotational, pivotal, slidable engagement with the seal block forward end outer surface prior to final assembly;

the first flange collar outer surface having a shape matching a forward end of the seal block raised center portion and being in rotational, slidable engagement therewith;

the second flange collar inner surface having a radius of curvature substantially the same as the seal block rearward end outer surface, said second flange collar inner surface in rotational, pivotal, slidable engagement with the seal block rearward end outer surface prior to final assembly;

the second flange collar outer surface having a shape matching a rearward half of the seal block raised center portion and being in rotational, slidable engagement therewith;

means for releasably securing the first and second flange shoulders together, with the flange collar inner and outer surfaces contacting the respective seal block outer surfaces and raised center portion, and radially compressing the seal block on the ends of the first and second pipes.

21. A universal conduit coupling for providing a tight fit between open ends of first and second conduits, comprising:

an annular seal block describing a quasi-toroid of generally semi-circular cross-section, having an inner surface, and an outer surface defined by a radius of curvature, the seal block having a predetermined inside shape and size for a friction fit on the first conduit open end;

a seal flange having a shoulder portion extending radially outwardly from an annular collar portion, the collar portion having an outer surface and an inner surface, the inner surface having a radius of curvature substantially the same as the seal block outer surface, said seal flange collar inner surface in rotational, pivotal, slidable engagement with the seal block outer surface;

an annular seal ring having an arcuate inner surface, an outer surface, and a front surface, the seal ring inner surface having a radius of curvature substantially the same as the seal block outer surface and in rotational, pivotal, slidable contact with the seal block outer surface, forwardly of the seal flange;

said seal ring outer surface having a shape matching the flange collar outer surface and being in rotational, slidable engagement therewith; and means for releasably securing the flange shoulder to the second conduit with the seal ring front surface in sealed engagement with the second conduct open end;

said seal ring inner and outer surfaces forming a wedge between the collar inner surface and seal block outer surface, and radially compressing the seal block when the flange shoulder is secured to said second conduit.

22. The coupling of claim 21 wherein said first conduit is generally rectangular in shape.

* * * * *